(12) United States Patent
Takiishi et al.

(10) Patent No.: US 7,783,311 B2
(45) Date of Patent: Aug. 24, 2010

(54) WIRELESS COMMUNICATIONS SYSTEM, TRANSMITTING STATION, AND RECEIVING STATION

(75) Inventors: Kosei Takiishi, Yokosuka (JP); Shinzo Ohkubo, Yokosuka (JP); Hirohito Suda, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 1058 days.

(21) Appl. No.: 10/936,527

(22) Filed: Sep. 9, 2004

(65) Prior Publication Data

US 2005/0054357 A1    Mar. 10, 2005

(30) Foreign Application Priority Data

Sep. 9, 2003    (JP) .............................. 2003-317463

(51) Int. Cl.
*H04B 7/00*    (2006.01)
(52) U.S. Cl. ...................... 455/502; 455/124; 455/500; 455/561; 324/763
(58) Field of Classification Search .................. 455/502
See application file for complete search history.

(56) References Cited

U.S. PATENT DOCUMENTS 3,852,534 A * 12/1974 Tilk .......................... 370/515

| | | | |
|---|---|---|---|
| 5,943,336 A | 8/1999 | Spahl | |
| 6,201,469 B1 * | 3/2001 | Balch et al. ................. | 340/10.1 |
| 6,463,261 B1 * | 10/2002 | Hiramatsu et al. ......... | 455/63.1 |
| 6,577,617 B1 | 6/2003 | Ue et al. | |
| 2004/0183559 A1 * | 9/2004 | Ware et al. .................. | 324/763 |
| 2006/0166619 A1 * | 7/2006 | Roberts ....................... | 455/39 |

FOREIGN PATENT DOCUMENTS

| | | |
|---|---|---|
| CN | 1250328 A | 4/2000 |
| GB | 2 373 420 A | 9/2002 |
| JP | 11-196473 | 7/1999 |
| WO | WO 95/32566 | 11/1995 |

* cited by examiner

*Primary Examiner*—Yuwen Pan
*Assistant Examiner*—Ajibola Akinyemi
(74) *Attorney, Agent, or Firm*—Oblon, Spivak, McClelland, Maier & Neustadt, L.L.P.

(57) ABSTRACT

A receiving station used in a wireless communication system receives information from one or more transmitting stations. The receiving station comprises a receiving unit (112) configured to receive information containing ID information of a transmitting station, and a data extracting unit (1011) configured to extract the ID information from the received information. Transmit timing sequence acquiring means (2012, 2013 and 2014) of the receiving station estimates a transmit timing sequence (Hs) of the transmitting station based on the extracted ID information. Synchronizing means (2014) of the receiving station brings the receive timing of the receiving station in synchronization with transmit timing of the transmitting station based on the transmit timing sequence.

12 Claims, 27 Drawing Sheets

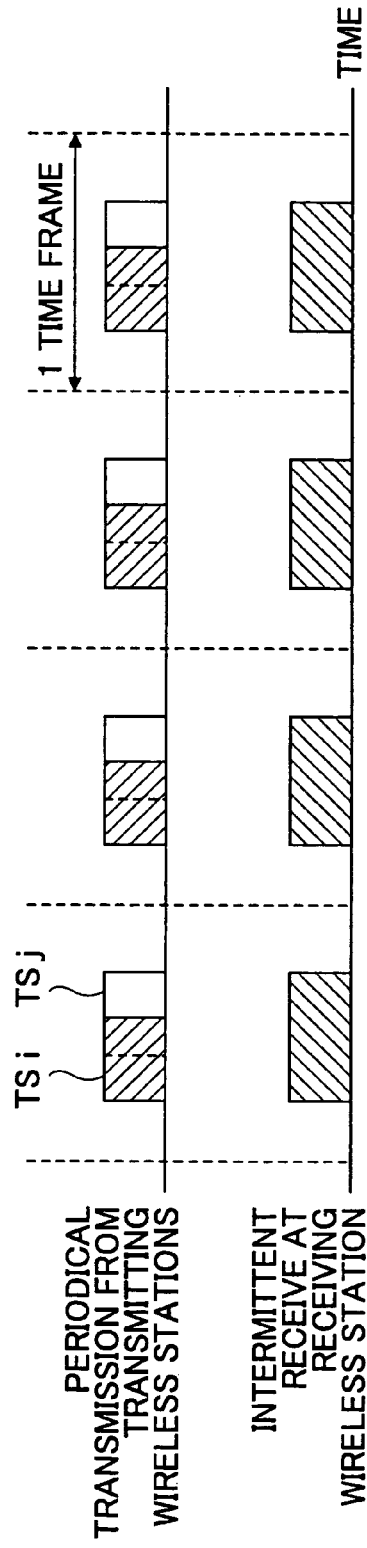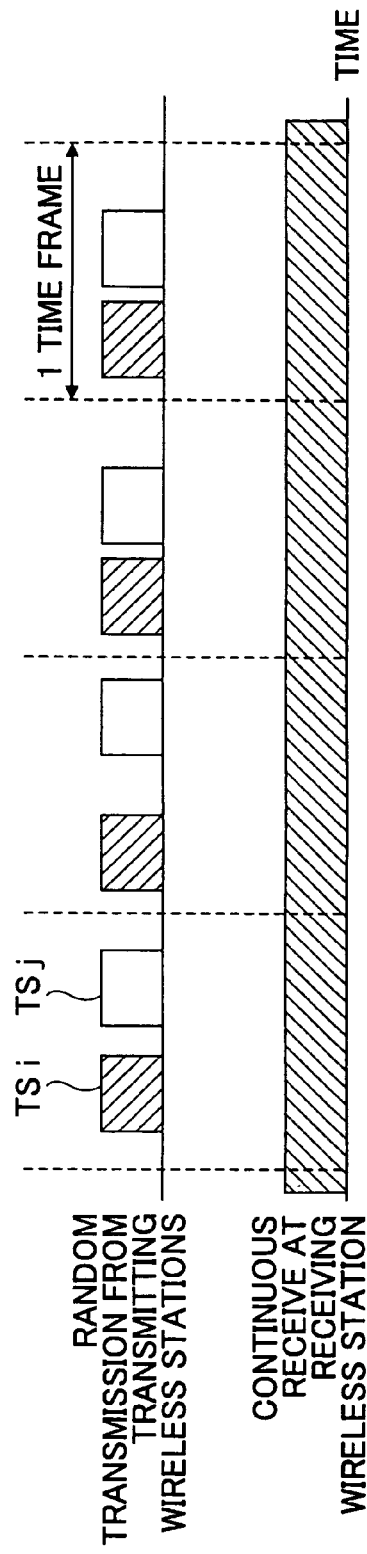

FIG.13

| TRANSMIT TIMING SEQUENCE NUMBER (Hc) | GENERATOR POLYNOMIAL SET (Rmath) | RANDOM SEQUENCE (Rs) |
|---|---|---|
| 1 | $Y=A_1X+B_1$ | 1  20  15  8  3 ··· |
| 2 | $Y=A_2X+B_2$ | 10  13  7  5  9 ··· |
| 3 | $Y=A_3X+B_3$ | 12  19  25  18  1 ··· |
| ⋮ | ⋮ | ⋮ |
| Hc | $Y=A_{Hc}X+B_{Hc}$ | 3  10  13  9  15 ··· |

WIRELESS COMMUNICATIONS SYSTEM, TRANSMITTING STATION, AND RECEIVING STATION

BACKGROUND OF THE INVENTION

1. Field of the Invention

The present invention generally relates to a wireless communications system including multiple transmitting stations and a receiving station for receiving information from the transmitting stations, as well as to a communication control technique used in such a wireless communication system.

2. Description of the Related Art

In wireless communications systems (such as mobile communications systems), contention occurs in a channel when multiple transmitting wireless stations have to share the channel to transmit data simultaneously. Accordingly, some access protocol for allocating the channel to each of the transmitting wireless stations is required to prevent data collisions. JP 11-196473A discloses a technique for avoiding collisions that may occur when multiple mobile stations power on at the same time. In this publication, a unique number is assigned to each mobile station. By counting down the number at each mobile station upon power-on, location registration signals are transmitted from the mobile stations at different timings.

Conventional access protocols are grouped into collision-free scheduled access protocols and random access protocols that may accompany data collision. An example of the scheduled access protocol is time division multiple access (TDMA) conventionally used in cellular communications system. TDMA is a digital transmission technology that allows multiple users to access a single radio-frequency (RF) channel without interference by allocating unique time slots to each user within each channel. However, since only a limited number of time slots are available in a single channel, appropriate transmit control becomes difficult under the situation where a number of cellular phones exist.

Random access protocols include repeat-type random access, such as ALOHA or S-ALOHA, and reserve-type random access, such as r-ALOHA. With ALOHA protocols, a transmitting wireless station waits a random amount of time and repeats transmission when data collision occurs. In this case, the receiving wireless station has to wait continuously until the data are correctly received. This scheme is inefficient because of large power consumption.

FIG. 1A illustrates an example of conventional periodic multiple access, in which all the transmitting wireless stations transmit periodically and the receiving wireless station performs intermittent receive. FIG. 1B illustrates an example of conventional random access, in which all the transmitting wireless stations transmit data after a random amount of time and the receiving wireless station performs continuous receive.

FIG. 2 is a schematic block diagram of a transmitting wireless station that employs a conventional periodic multiple access protocol, and FIG. 3 is a schematic block diagram of a receiving wireless station that employs a conventional periodic multiple access protocol.

The conventional transmitting wireless station 100 shown in FIG. 2 has a data storage unit 101, an isochronous burst transmission control unit 102, a clock generating unit 103, a transmitting unit 104, a switch 105, a power ON/OFF unit 106, and an antenna 107.

The data storage unit 101 stores transmit timing signals (Hnum), the number of slots in a single time frame (Fslot), time frame (Ftime) information, transmit clock information (clock_t), and other necessary information. Transmit timing signal (Hnum) represents the slot number assigned to the transmitting wireless station 100 for constant-interval data transmission. The number of slots (Fslot) represents how many slots are provided in a single time frame. A time frame (Ftime) represents a single frame of time required for one-frame transmission. The transmit clock information (clock_t) represents a time clock at the transmitting wireless station 100.

The clock generating unit 103 counts clocks, which are time information required to perform burst transmission of data. The maximum value of the counter is consistent with the number of slots (Fslot) in a single time frame. The clock generating unit 103 outputs the counter value as the transmit clock information (clock_t) any time to the isochronous burst transmission control unit 102, and simultaneously, stores the counter value in the data storage unit 101.

The isochronous burst transmission control unit 102 reads a transmit timing signal (Hnum) from the data storage unit 101, while it receives the transmit clock information (clock_t) from the clock generating unit 103. Whenever the transmit timing signal (Hnum) and the transmit clock information (clock_t) are the same, the isochronous burst transmission control unit 102 supplies a switch-on instruction to the switch 105. When the transmit timing signal (Hnum) and the transmit clock information (clock_t) are not consistent with each other, the isochronous burst transmission control unit 102 does not supply the switch-on instruction.

The transmitting unit 104 is connected to the antenna 107 via the switch 105 to transmit the input data. When the switch 105 receives the switch-on instruction from the isochronous burst transmission control unit 102, the data from the transmitting unit 104 are transmitted from the antenna 107. In this manner, the transmitting wireless station 100 transmits data at a constant interval (periodically). The switch 105 is in the off state unless it receives the switch-on instruction from the isochronous burst transmission control unit 102.

The power on/off unit 106 turns on or off the respective circuits in the transmitting wireless station 100 in response to a power on/off instruction supplied externally.

On the other hand, the receiving wireless station 110 shown in FIG. 3 includes a data storage unit 111, a receiving unit 112, an isochronous burst receive control unit 113, a clock generating unit 114, a power on/off unit 115, and an antenna 116.

In the data storage unit 111 are stored receive timing signals (Hnum_r), the number of slots in a single time frame (Fslot), time frame (Ftime) information, receive clock information (clock_r), etc. Receive timing signal (Hnum_r) represents the slot number of a slot having arrived from the transmitting wireless station 100. The receive clock information (clock_r) represents a time clock at the receiving wireless station 110.

The clock generating unit 114 counts clocks, which are time information required to perform intermittent receive of data. The maximum value of the counter is consistent with the number of slots (Fslot) in a single time frame. The clock generating unit 114 outputs the counter value as the receive clock information (clock_r) any time to the isochronous burst receive control unit 113, and simultaneously, stores the counter value in the data storage 111.

The isochronous burst receive control unit 113 reads a receive-timing signal (Hnum_r) from the data storage unit 111, while it receives the receive clock information (clock_r) from the clock generating unit 114. Whenever the receive-timing signal (Hnum_r) and the receive clock information (clock_r) are consistent with each other, the isochronous burst receive control unit 113 supplies a receive instruction to the receiving unit 112. When the receive-timing signal (Hnum_r) and the receive clock information (clock_t) are not consistent with each other, the isochronous burst receive control unit 113 does not output the receive instruction.

Upon acquiring the receive instruction from the isochronous burst receive control unit 113, the receiving unit 112 receives data from the transmitting wireless station 100 via the antenna 116. The receiving unit 112 performs a CRC check on the received data. If there is no error in the received data, the receiving unit 112 outputs the data externally. The power on/off unit 115 turns on or off the respective circuits in the receiving wireless station 110 in response to a power on/off instruction supplied externally.

FIG. 4 is a schematic block diagram of a transmitting wireless station that employs a conventional random access protocol, and FIG. 5 is a schematic block diagram of a receiving wireless station that employs a conventional random access protocol.

The transmitting wireless station 200 shown in FIG. 4 has a data storage unit 101, a clock generating unit 103, a transmitting unit 104, a switch 105, a power ON/OFF unit 106, an antenna 107, a random number generator 201, and a burst transmission control unit 202. The same elements as those shown in FIG. 2 are denoted by the same symbols, and explanation for them is omitted.

The random number generator 201 reads the number of slots (Fslot) of a single frame from the data storage unit 101 to generate random numbers taking values of 1 through Fslot, and stores the random numbers as the transmit timing signal (Hnum) in the data storage unit 101. The random number generator 201 also reads the transmit clock information (clock_t) from the data storage unit 101. If the transmit clock information (clock_t) is zero (0), a new random number is generated and stored as updated transmit timing signal (Hnum) in the data storage unit 101.

The burst transmission control unit 202 reads the transmit timing signal (Hnum) from the data storage unit 101, while it receives the transmit clock information (clock_t) from the clock generating unit 103. Whenever the transmit timing signal (Hnum) and the transmit clock information (clock_t) are consistent with each other, the burst transmission control unit 202 supplies a switch-on instruction to the switch 105. Upon receiving the switch-on instruction from the burst transmission control unit 202, the switch 105 allows the data from the transmitting unit 104 to be transmitted from the antenna 107. The switch 105 is in the off state unless it receives the switch-on instruction from the burst transmission control unit 202.

On the other hand, the receiving wireless station 210 shown in FIG. 5 includes data storage unit 111, a receiving unit 112, a clock generating unit 114, a power on/off unit 115, and an antenna 116. The same elements as those shown in FIG. 3 are denoted by the same numerical references, and explanation for them is omitted. The receiving wireless station 210 does not perform intermittent receive, unlike the receiving wireless station 110 shown in FIG. 3, and instead, it is always in the waiting state to perform continuous receive.

However, with the conventional periodic multiple access protocol, the transmit timing of the transmitting wireless station i and the transmit timing of the transmitting wireless station j overlap each other, as illustrated in FIG. 1A. Accordingly, once data collision occurs, data collision keeps on occurring in the subsequent time frames. With the conventional random access protocol, the receiving wireless station has to always be in the waiting state because the transmit timing of each transmitting wireless station is unknown. This causes the power consumption to increase.

SUMMARY OF THE INVENTION

In view of the above-described problems, a new access protocol for preventing data collision and reducing power consumption is required by allowing the transmitting wireless station to perform random transmission, while allowing the receiving wireless station to perform intermittent receive, as illustrated in FIG. 6.

Therefore, it is an object of the present invention to provide a wireless communications system, a transmitting wireless station, and a receiving wireless station, which realize the access control scheme shown in FIG. 6, reducing both data collision and power consumption.

To achieve the objects, in one aspect of the invention, a wireless communications system includes one or more transmitting stations and a receiving station configured to receive data from the transmitting stations. The transmitting station comprises a transmitting unit configured to transmit information containing a unique value of the transmitting station; first transmit timing sequence acquiring means that acquires one or more transmit timing sequences based on the unique value or a common value; and a transmission control unit configured to control transmission of information based on the acquired transmit timing sequences. The receiving station comprises a receiving unit configured to receive the information containing the unique value of the transmitting station; an extracting unit configured to extract the unique value from the received information; second transmit timing sequence acquiring means that acquires said one or more transmit timing sequences based on the extracted unique value; and synchronizing means that brings receive timing of the receiving station in synchronization with transmit timing of the transmitting station based on the transmit timing sequences.

With this communications system, data transmit timing of each transmitting station is adjusted so as to avoid data collision even at simultaneous data transmission. In addition, the receiving station can receive data at the same timing of data transmission of the transmitting station, and therefore, power consumption can be reduced.

In another aspect of the invention, a transmitting station used in a wireless communications system and adapted to transmit information to a receiving station is provided. The transmitting station comprises a transmitting unit configured to transmit information containing a unique value of the transmitting station; transmit timing sequence acquiring means that acquires one or more transmit timing sequences based on the unique value or a common value used among transmitting stations in a communication range of the receiving station; and a transmission control unit configured to control the transmission of the information to the receiving station based on the acquired transmit timing sequences.

With this arrangement, the transmitting station acquires a transmit timing sequence based on the unique value of the transmitting station itself, and therefore, overlap of transmit timing among multiple transmitting stations in the wireless communications system can be avoided. Consequently, data collision can be prevented.

In still another aspect of the invention, a receiving station used in a wireless communications system and adapted to receive information from one or more transmitting stations is provided. The receiving station comprises a receiving unit configured to receive information containing a unique value of the transmitting station; an extracting unit configured to extract the unique value from the received information; transmit timing sequence acquiring means that acquires a transmit timing sequence of the transmitting station based on the extracted unique value; and synchronizing means that brings receive timing of the receiving station in synchronization with transmit timing of the transmitting station based on the transmit timing sequence.

With this arrangement, the receiving station keeps the receive timing in sync with the transmit timing of the transmitting station, and it can perform receiving operations at appropriate timing according to the environment.

BRIEF DESCRIPTION OF THE DRAWINGS

Other objects, features, and advantages of the invention will become more apparent from the following detailed description when read in conjunction with the accompanying drawings, in which FIG. 1A is a schematic diagram illustrating a conventional periodic multiple access protocol, and FIG. 1B is a schematic diagram illustrating a conventional random access protocol;

FIG. 13 is an example of a random sequence mapping table used in the transmitting wireless station according to the second embodiment;

DETAILED DESCRIPTION OF THE PREFERRED EMBODIMENT

The present invention is described in detail below in conjunction with the attached drawings.

Figure 7:
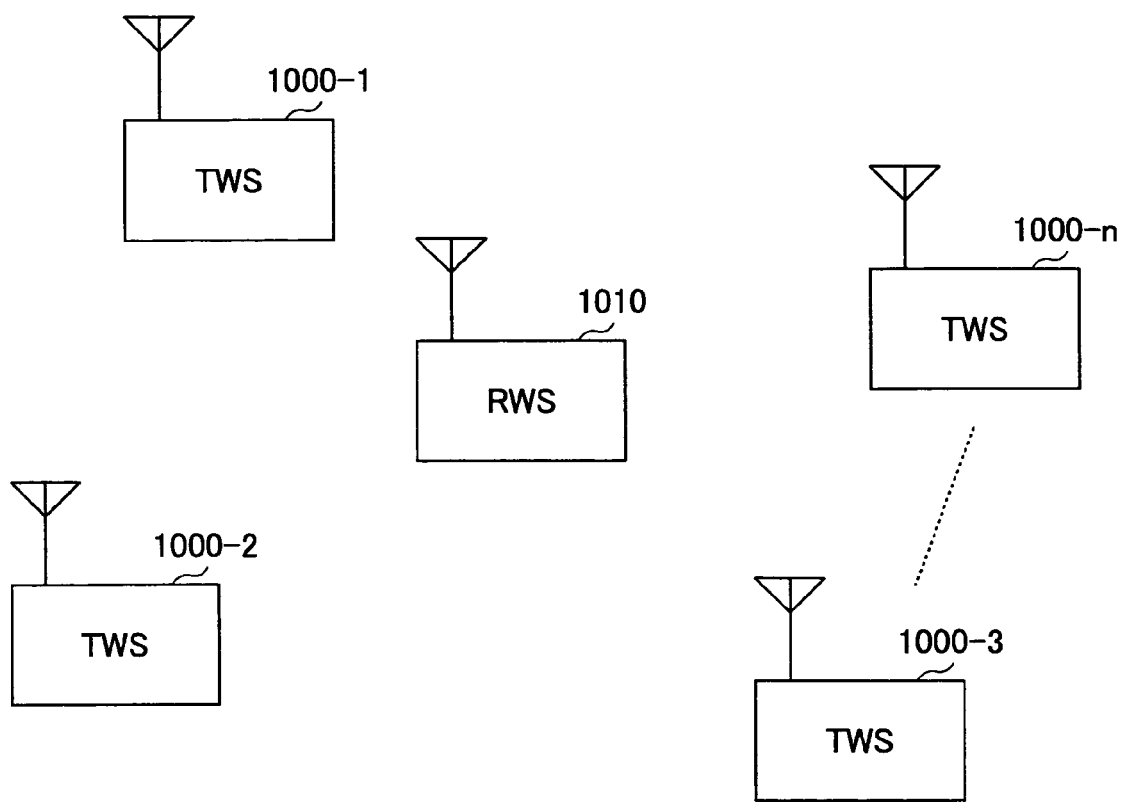
FIG. 7 schematically illustrates a wireless communications system that includes multiple transmitting wireless stations and a receiving wireless station according to the first embodiment of the invention.

FIG. 7 schematically illustrates an example of a wireless communications system according to the first embodiment of the invention. This communications system is, for example, a mobile communications system including multiple transmitting wireless stations (e.g., mobile terminals) 1000-1 through 1000-n, and a receiving wireless station (e.g., a base station) 1010 that receives data from each of the transmitting wireless stations (TWS) 1000-1 through 1000-n. This configuration also applies to the second through seventh embodiments described below.

Figure 2:
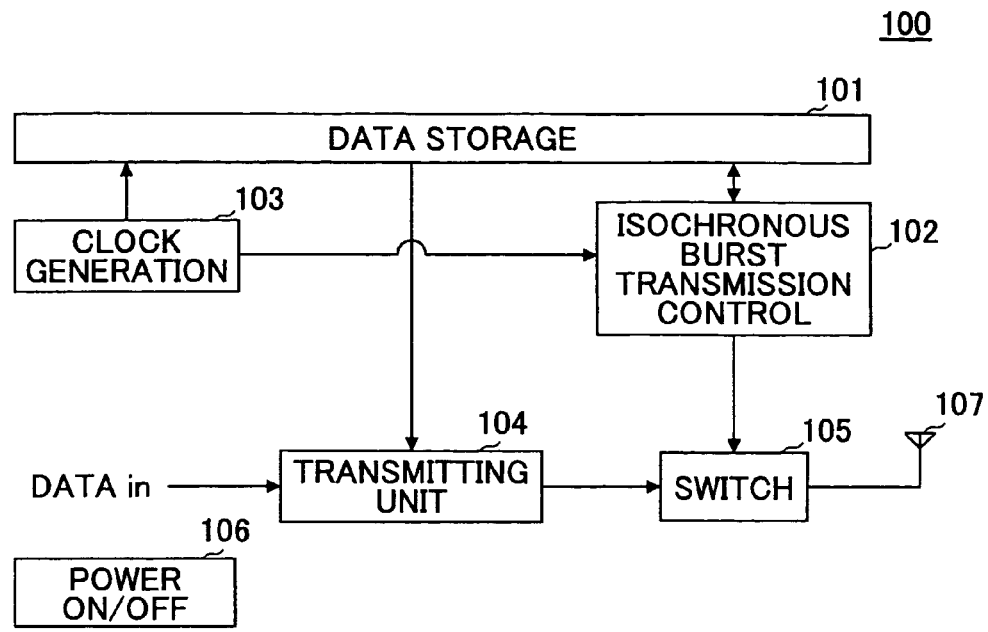
FIG. 2 is a schematic block diagram of a transmitting wireless station employing the periodic multiple access protocol shown in FIG. 1A.
Figure 8:
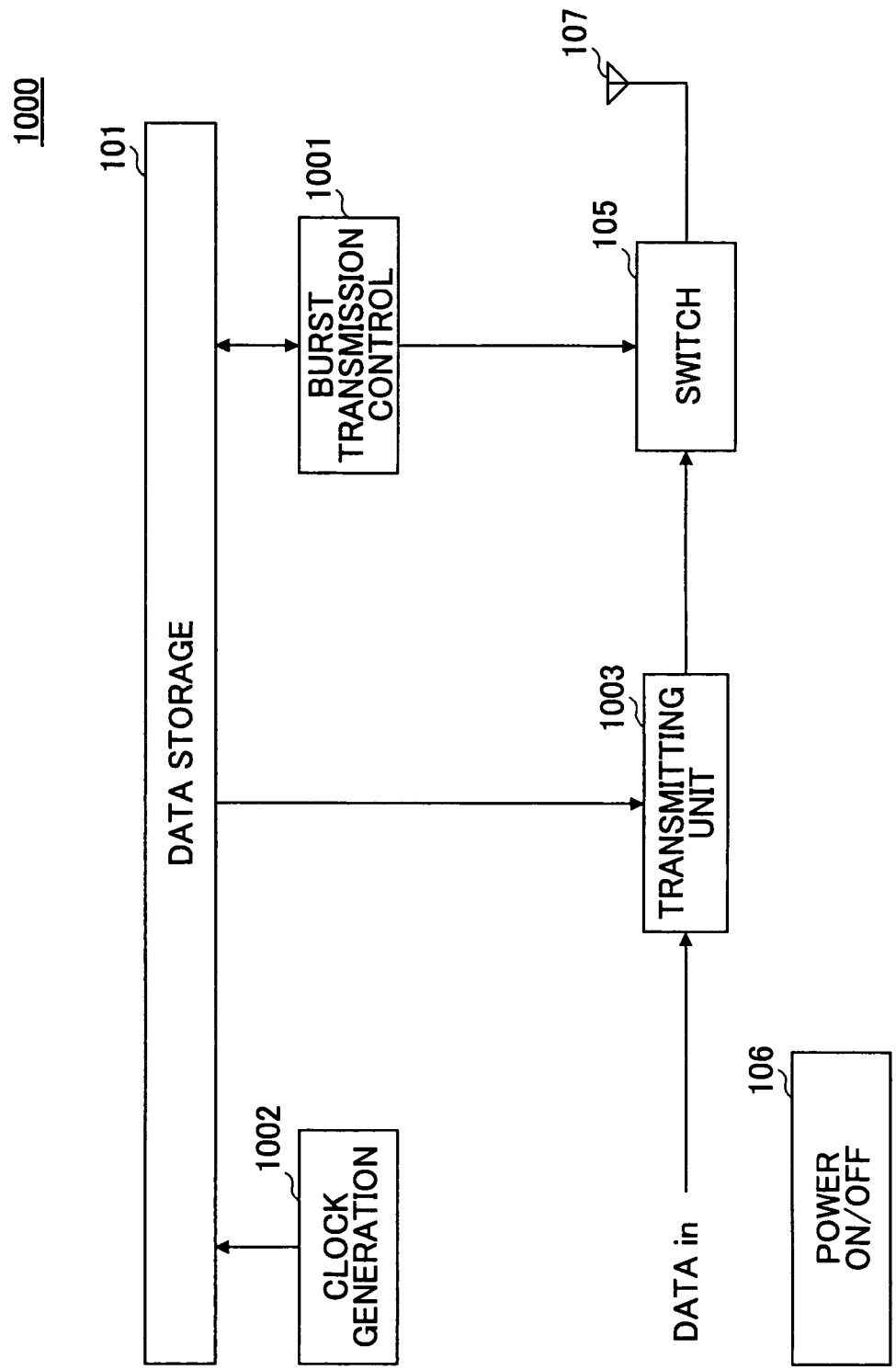
FIG. 8 is a schematic block diagram of the transmitting wireless station according to the first embodiment of the invention.

FIG. 8 is a schematic block diagram of the transmitting wireless station 1000 according to the first embodiment of the invention. The transmitting wireless station 1000 includes a data storage unit 101, a switch 105, a power on/off unit 106, an antenna 107, a burst transmission control unit 1001, a clock generating unit 1002, and a transmitting unit 1003. The same elements as those shown in FIG. 2 are denoted by the same numerical references.

The data storage unit 101 stores the identification number (ID) of the transmitting wireless station, a transmit timing sequence (Hs), the period (Ht) of the transmit timing sequence, the focused code number (Hn_t) of the transmit timing sequence, the number of slots (Fslot) in a time frame, a time frame (Ftime), transmit clock information (clock_t), and the readout count (Hs_num_t) of the transmit timing sequence.

The identification (ID) of the transmitting wireless station is a unique N-bit number assigned to the transmitting wireless station 1000. The transmit timing sequence (Hs) is a sequence describing data transmit timing on the time axis. The transmit timing sequence period (Ht) represents the number of frames corresponding to the repeat period of the transmit timing sequence. The focused code number (Hn_t) of the transmit timing sequence (Hs) represents the code number in the transmit timing sequence currently read out for burst transmission control. The number of slots (Fslot) in a frame denotes that the time frame is divided into this number of time slots. The time frame (Ftime) denotes the frame size or the time duration for one-frame transmission. The transmit clock information (clock_t) represents the clock time of the transmitting wireless station 1000. The readout count (Hs_num_t) of the transmit timing sequence is incremented every time the clock of the transmitting wireless station 1000 counts the product of the time frame (Ftime) and the transmit timing sequence period (Ht). The transmit clock information (clock_t) may be reset to zero every time the clock value reaches the product (Hs_num_t)*(Ftime)*(Ht) of transmit timing sequence readout count (Hs_num_t), time frame (Ftime), and transmit timing sequence period (Ht). The data storage unit 101 may acquire a transmit timing sequence (Hs) generated by an external apparatus. In this case, the data storage unit 101 functions as transmit timing sequence acquiring means.

The clock generating unit 1002 counts the clock as time passes, which clock time is necessary information for burst transmission of data. The clock generating unit 1002 stores the count value as transmit clock information (clock_t) in the data storage unit 101 for every count.

The burst transmission control unit 1001 reads the transmit timing sequence (Hs), the transmit timing sequence period (Ht), the focused code number (Hn_t) of the transmit timing sequence, the time frame (Ftime), the transmit clock information (clock_t), and the transmit timing sequence readout count (Hs_num_t) out of the data storage unit 101. The burst transmission control unit 1001 adds the current code value corresponding to the focused code number (Hn_t) of the transmit timing sequence (Hs) to the product (Hs_num_t× Ftime×Ht) obtained from the transmit timing sequence readout count (Hs_num_t), the time frame (Ftime), and the transmit timing sequence period (Ht). The burst transmission control unit 1001 compares the sum (or the addition result) with the transmit clock information (clock_t). If these two are the same, the burst transmission control unit 1001 supplies a switch-on instruction to the switch 105. If the two values are not consistent with each other, the burst transmission control unit 1001 does not generate the switch-on instruction.

If the addition result agrees with the transmit clock information (clock_t), the burst transmission control unit 1001 increments or adds "1" to the focused code number (Hn_t) of the transmit timing sequence. When the incremented value of the focused code number (Hn_t) of the transmit timing sequence reaches or exceeds the transmit timing sequence period (Ht), the burst transmission control unit 1001 subtracts the transmit timing sequence period (Ht) from the focused code number (Hn_t) of the transmit timing sequence, and uses the subtraction value as the undated focused code number (Hn_t) of the transmit timing sequence for the subsequent process. In addition, the burst transmission control unit 1001 adds "1" to the transmit timing sequence readout count (Hs_num_t), and uses the incremented value as the new readout count (Hs_num_t) of the transmit timing sequence for the subsequent process.

The transmitting unit 1003 is connected to the antenna 107 via the switch 105 in order to transmit the identification number (ID) of the transmitting wireless station and the input data. The input data include, for example, an acceleration signal detected by the acceleration sensor, a GPS signal, and a clock signal from the wave clock. The transmitting unit 1003 outputs the input data and the identification number (ID) of the transmitting wireless station read out from the data storage unit 101. If there is no input data, the transmitting unit 1003 may output only the identification number (ID) of the transmitting wireless station.

Upon the switch-on instruction from the burst transmission control unit 1001, the switch 105 allows the data output from the transmitting unit 1003 to be transmitted from the antenna 107. The switch 105 is in the off state unless the switch-on instruction is supplied from the burst transmission control unit 1001. The power on/off unit 106 turns on or off the internal circuits of the transmitting wireless station 1000 in response to a power-on request or a power-off request supplied externally.

Figure 3:
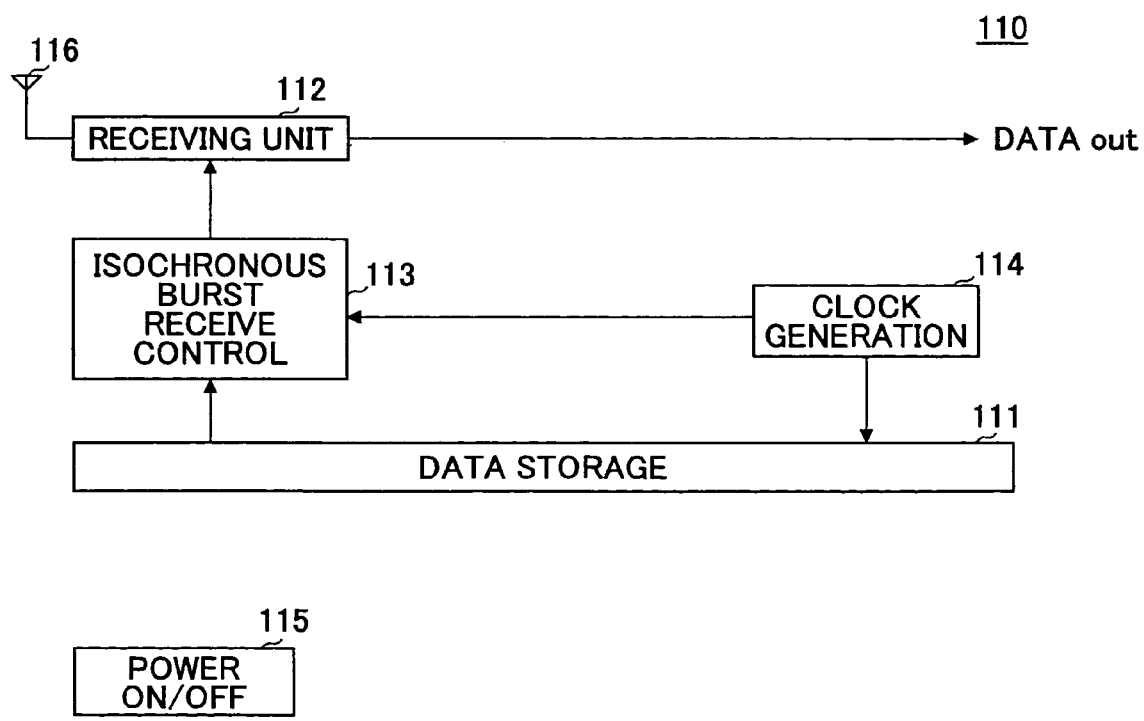
FIG. 3 is a schematic block diagram of a receiving wireless station employing the periodic multiple access protocol shown in FIG. 1A.
Figure 4:
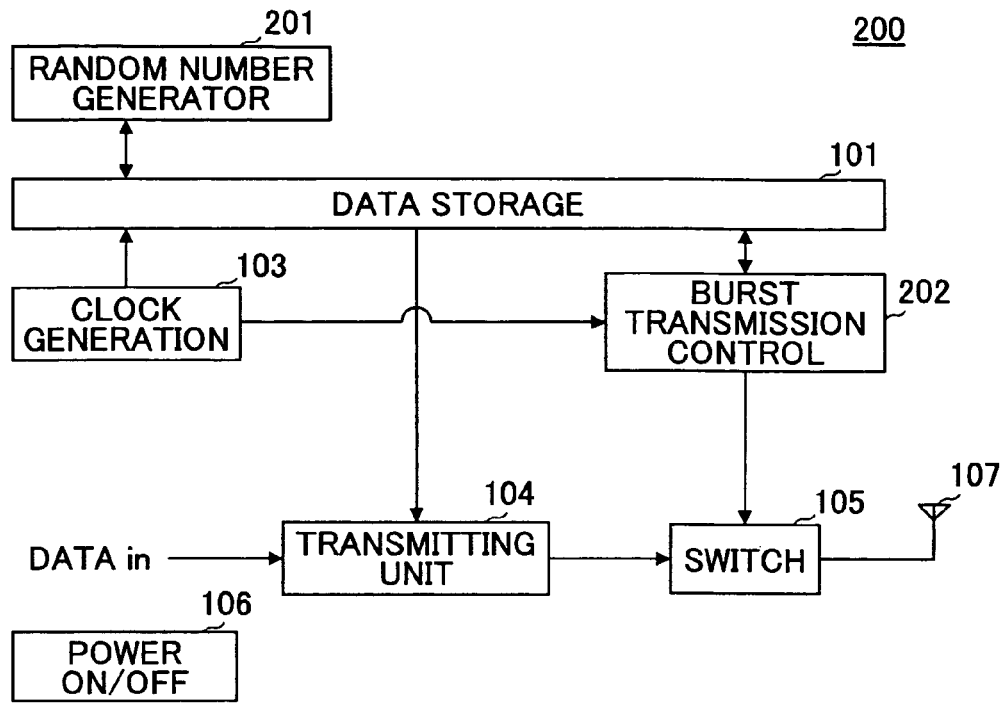
FIG. 4 is a schematic block diagram of a transmitting wireless station employing the random access protocol shown in FIG. 1B.
Figure 5:
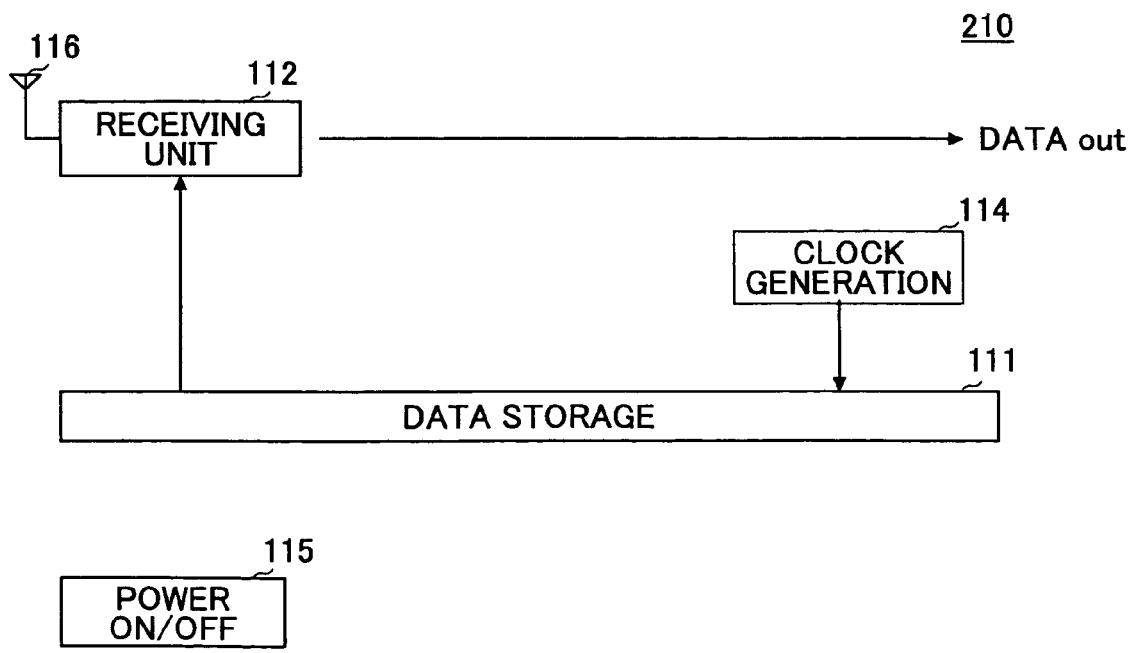
FIG. 5 is a schematic block diagram of a receiving wireless station employing the random access protocol shown in FIG. 1B.
Figure 6:
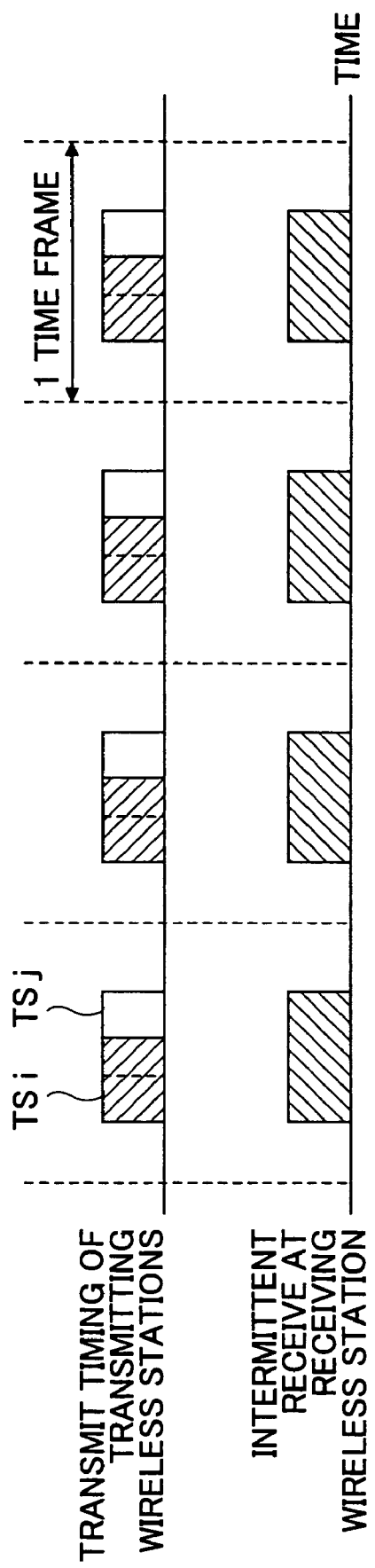
FIG. 6 is a schematic diagram of a desired access protocol that allows the transmitting wireless station to perform random transmission, while allowing the receiving wireless station to perform intermittent receive.
Figure 9:
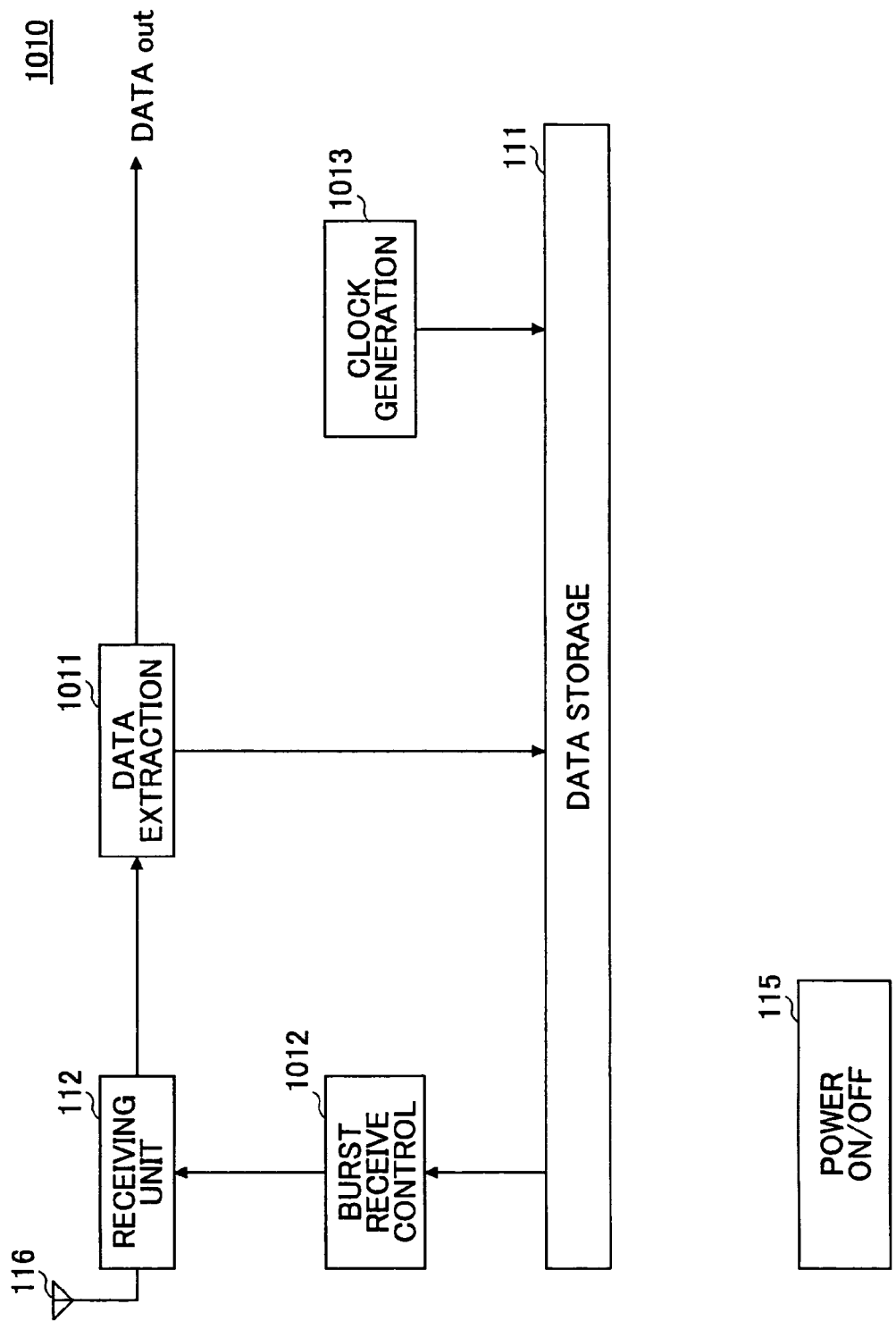
FIG. 9 is a schematic block diagram of the receiving wireless station according to the first embodiment of the invention.

FIG. 9 is a schematic block diagram of the receiving wireless station according to the first embodiment of the invention. The receiving wireless station 1010 has a data storage unit 111, a receiving unit 112, a power on/off unit 115, an antenna 116, a data extracting unit 1011, a burst receive control unit 1012, and a clock generating unit 1013. The same elements as those shown in FIG. 3 are denoted by the same numerical references.

The data storage unit 111 stores the identification number (ID) of each transmitting wireless station, a transmit timing sequence (Hs), a transmit timing sequence period (Ht), the focused code number (Hn_r) of the transmit timing sequence, receive clock information (clock_r), transmit timing sequence readout count (Hs_Num_r), and time frame (Ftime).

The receive clock information (clock_r) represents the clock time at the receiving wireless station 1010. The transmit timing sequence readout count (Hs_num_r) is incremented every time the clock of the receiving wireless station 1010 counts the product of the time frame (Ftime) and the transmit timing sequence period (Ht).

The receiving unit 112 receives data from the transmitting wireless station 1000 via the antenna 116. The receiving unit 112 performs a CRC check on the received data. If there is no error in the received data, the receiving unit 112 outputs the data to the data extracting unit 1011. The data extracting unit 1011 separates the identification (ID) of the transmitting wireless station 1000 from the received data. The data extracting unit 1011 stores the ID information of the transmitting wireless station 1000 in the data storage unit 111, and outputs the other components of the received data externally.

The clock generating unit 1013 counts the clocks, which count is time information necessary for intermittent reception of data. The clock generating unit 1013 stores the count value as the receive clock information (clock_r) in the data storage unit 111 for every count.

The burst receive control unit 1012 reads the ID information (ID) of the transmitting wireless station 1000, the transmit timing sequence (Hs), the transmit timing sequence period (Ht), the focused code number (Hn_r) of the transmit timing sequence, the time frame (Ftime), the receive clock information (clock_r), and the transmit timing sequence readout count (Hs_num_r) out of the data storage unit 111. The burst receive control unit 1012 adds the current code value corresponding to the focused code number (Hn_r) of the transmit timing sequence (Hs) to the product (Hs_num_r× Ftime×Ht) of the transmit timing sequence readout count (Hs_num_r) and the time frame (Ftime) multiplied by the transmit timing sequence period (Ht). The burst receive control unit 1012 compares the sum (or the addition result) with the receive clock information (clock_r). If these two are the same, the burst receive control unit 1012 generates and supplies an await instruction to the receiving unit 112. If the two values are not consistent with each other, the burst receive control unit 1012 does not generate the await instruction.

Upon receiving the await instruction from the burst receive control unit 1012, the receiving unit 112 receives data from the transmitting wireless station 1000 via the antenna 116. The receiving unit 112 performs a CRC check on the received data. If there is no error in the received data, the receiving unit 112 outputs the data to the data extracting unit 1011. The data extracting unit 1011 separates the identification (ID) of the transmitting wireless station from the received data. The data extracting unit 1011 stores the ID information of the transmitting wireless station in the data storage unit 111, and outputs the other components of the received data externally.

If the addition result agrees with the receive clock information (clock_r), the burst receive control unit 1012 increments or adds "1" to the focused code number (Hn_r) of the transmit timing sequence. If the focused code number (Hn_r) of the transmit timing sequence reaches or exceeds the transmit timing sequence period (Ht) as a result of the increment, then the burst receive control unit 1012 subtracts the transmit timing sequence period (Ht) from the incremented current code value (Hn_r) of the transmit timing sequence, and uses this subtraction result as the updated focused code number (Hn_r) of the transmit timing sequence for the subsequent process. In addition, the burst receive control unit 1012 adds "1" to the transmit timing sequence readout count (Hs_num_r), and uses the incremented value as the new transmit timing sequence readout count (Hs_num_r) for the subsequent process.

Next, explanation is made of the operations of the transmitting wireless station and the receiving wireless station of the first embodiment, with reference to the flowcharts.

Figure 10:
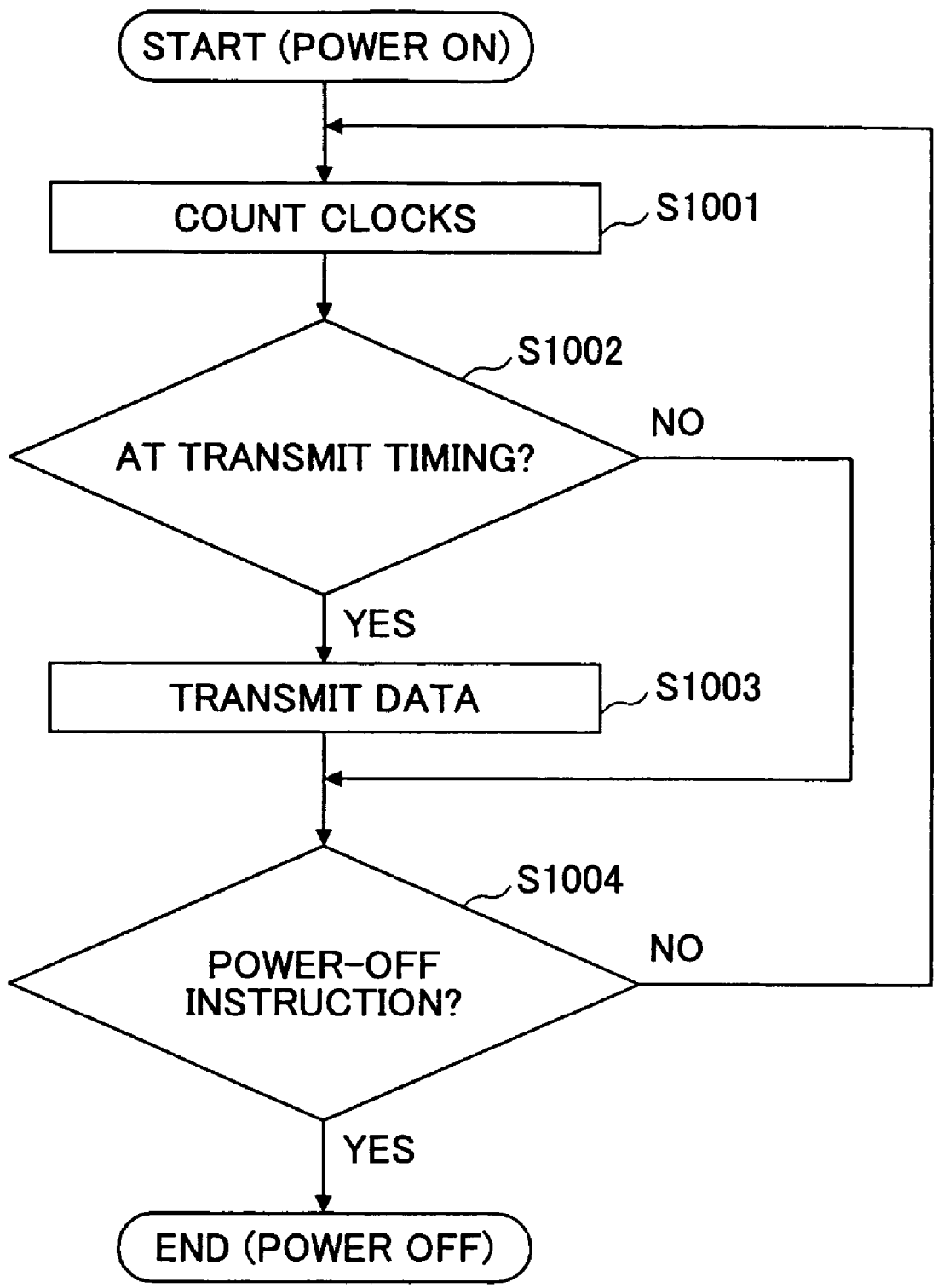
FIG. 10 is a flowchart of the operations carried out by the transmitting wireless station according to the first embodiment of the invention.

FIG. 10 is a flowchart showing the operations executed by the transmitting wireless station 1000 according to the first embodiment. When the power on/off unit 106 turns on the internal circuits of the transmitting wireless station 1000 in response to an externally supplied instruction, the clock generating unit 1002 starts counting clocks, and stores the count value as the transmit clock information (clock_t) in the data storage unit 101 (step S1001).

Then, the burst transmission control unit 1001 determines whether it is at data transmit timing (step S1002). To be more precise, the burst transmission control unit 1001 reads the transmit timing sequence (Hs), the transmit timing sequence period (Ht), the focused code number (Hn_t) of the transmit timing sequence, the time frame (Ftime), the transmit clock information (clock_t), and the transmit timing sequence readout count (Hs_num_t) out of the data storage unit 101. The burst transmission control unit 1001 adds the current code value corresponding to the focused code number (Hn_t) of the transmit timing sequence (Hs) to the product (Hs_num_t× Ftime×Ht) obtained from the transmit timing sequence readout count (Hs_num_t), the time frame (Ftime), and the transmit timing sequence period (Ht). The burst transmission control unit 1001 compares the sum (or the addition result) with the transmit clock information (clock_t).

If these two are the same, the burst transmission control unit 1001 determines that it is at transmit timing (YES in S1002), and supplies a switch-on instruction to the switch 105. If the addition result does not agree with the transmit clock information, the burst transmission control unit 1001 determines that it is not at data transmit timing (NO in S1002). In this case, the switch-on instruction is not generated, and the process proceeds to step S1004.

If the determination result is affirmative (YES in S1002), the transmitting unit 1003 outputs the input data and the identification (ID) of the transmitting wireless station 1000 read out from the data storage unit 101. Since the switch 105 is ON in response to the instruction from the burst transmission control unit 1001, the data and the ID are transmitted from the antenna 107 (step S1003).

After the data transmission (S1003), or after the negative determination as to the transmit timing (NO in S1002), the power on/off unit 106 determines whether a power-off instruction has been received externally (step S1004). If no power-off instruction has been received (NO in S1004), the steps from S1001 to S1003 are repeated. Upon the power-off instruction (YES in S1004), the power on/off unit 106 turns off the internal circuits of the transmission wireless station 1000, and the process terminates.

Figure 11:
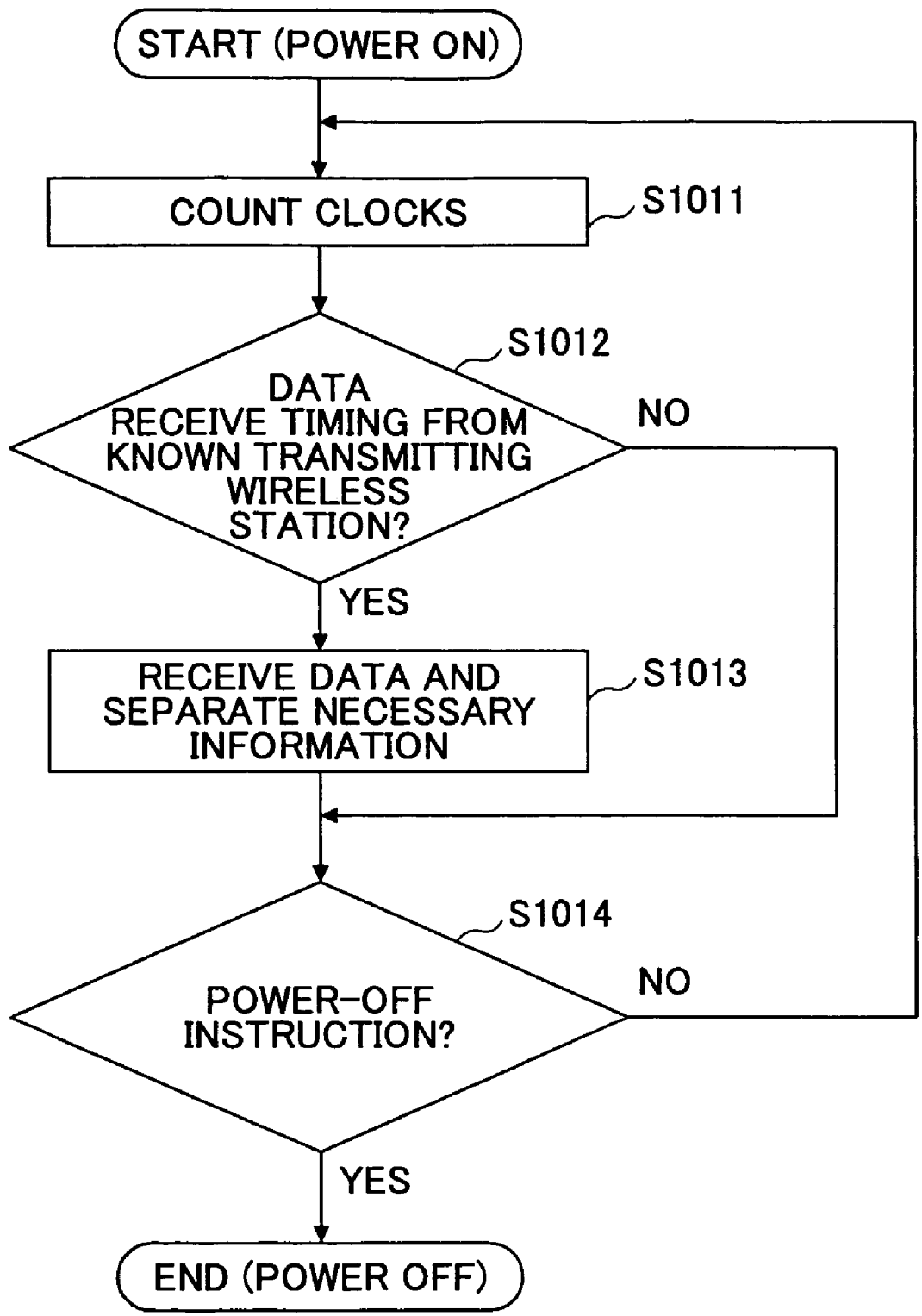
FIG. 11 is a flowchart of the operations carried out by the receiving wireless station according to the first embodiment of the invention.

FIG. 11 is a flowchart showing the operations executed by the receiving wireless station 1010 according to the first embodiment. When the power on/off unit 115 turns on the internal circuits of the receiving wireless station 1000 in response to an externally supplied instruction, the clock generating unit 1013 starts counting clocks, and stores the count value as the receive clock information (clock_r) in the data storage unit 111 (step S1011).

Then, the burst receive control unit 1012 determines whether it is at data receive timing for receiving data from a known transmitting wireless station (step S1012). To be more precise, the burst receive control unit 1012 reads the transmit timing sequence (Hs), the transmit timing sequence period (Ht), the focused code number (Hn_r) of the transmit timing sequence, the time frame (Ftime), the receive clock information (clock_r), and the transmit timing sequence readout count (Hs_num_r) out of the data storage unit 111. The burst receive control unit 1012 adds the current code value corresponding to the focused code number (Hn_r) of the transmit timing sequence (Hs) to the product (Hs_num_r×Ftime×Ht) of the transmit timing sequence readout count (Hs_num_r) and the time frame (Ftime) multiplied by the transmit timing sequence period (Ht). The receive control unit 1012 compares the sum (or the addition result) with the receive clock information (clock_r). If these two are the same, the burst receive control unit 1012 determines that it is at data receive timing (YES in S1012). In this case, the burst receive control unit 1012 generates and supplies an await instruction to the receiving unit 112. If the determination result is negative (NO in S1012) based on inconsistency of the comparison result, the await instruction is not generated.

Upon receiving the await instruction (YES in S1012), the receiving unit 112 receives data from the transmitting wireless station via the antenna 116, and performs a CRC check on the received data. If there is no error in the received data, the data are supplied to the data extracting unit 1011. The data extracting unit 1011 separates the ID information of the transmitting wireless station from the received data, and stores the extracted ID information in the data storage unit 111, while outputting the other components of the received data externally (step S1013).

After the data separation (S1013) or after the negative determination in step S1012 (NO in S1012), the power on/off unit 115 determines whether a power-off instruction has been received externally (step S1014). If no power-off instruction has been received (NO in S1014), the steps from S1011 to S1013 are repeated. Upon the power-off instruction (YES in S1014), the power on/off unit 115 turns off the internal circuits of the receiving wireless station 1010, and the process terminates.

Second Embodiment

Figure 12:
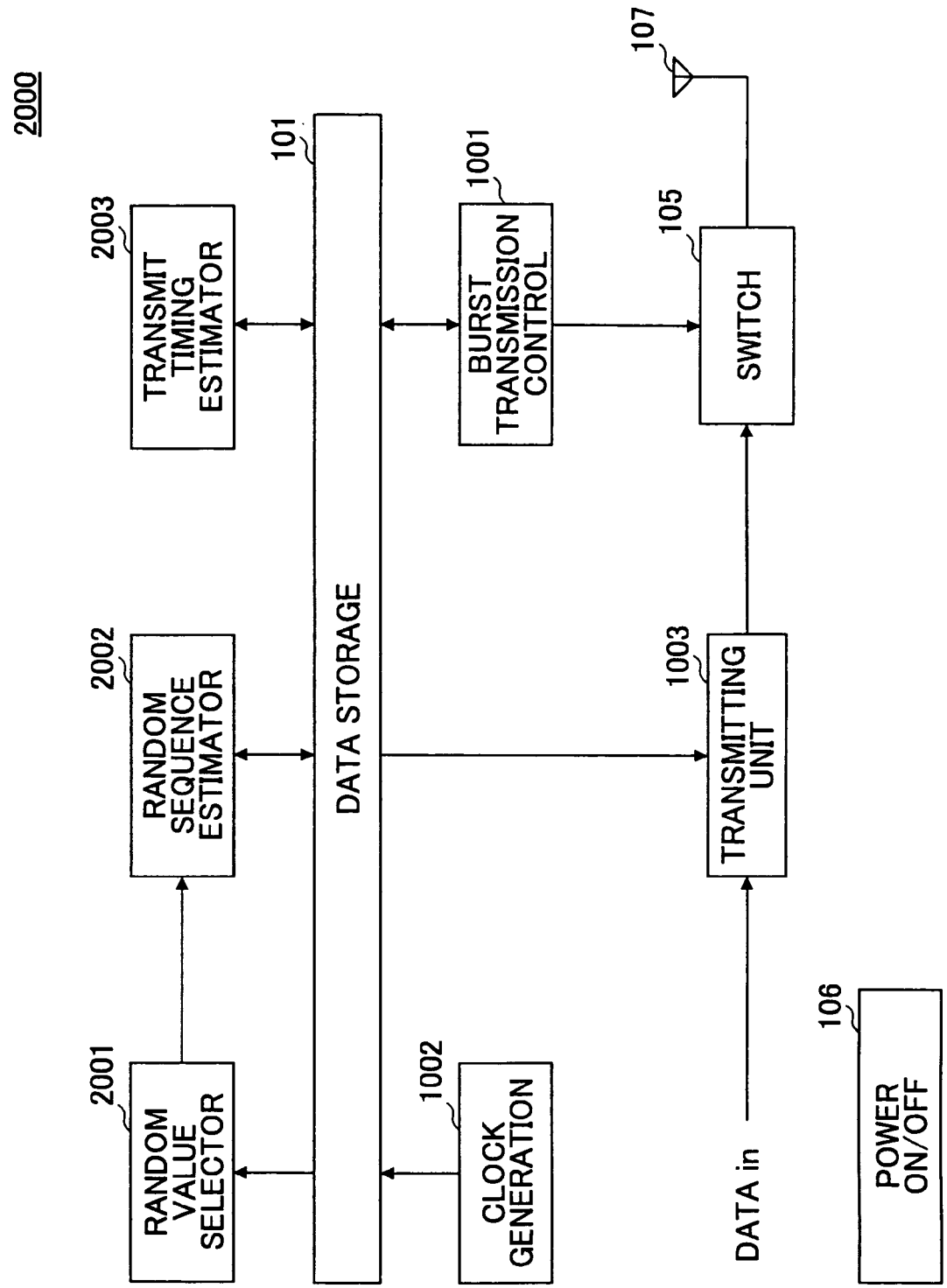
FIG. 12 is a schematic block diagram of a transmitting wireless station according to the second embodiment of the invention.

FIG. 12 is a schematic block diagram of the transmitting wireless station 2000 according to the second embodiment of the invention. The transmitting wireless station 2000 includes a data storage unit 101, a switch 105, a power on/off unit 106, an antenna 107, a burst transmission control unit 1001, a clock generating unit 1002, a transmitting unit 1003, a random value selector 2001, a random sequence estimator 2002, and a transmit timing estimator 2003. The random value selector 2001, the random sequence estimator 2002, and the transmit timing estimator 2003 structure transmit timing sequence acquiring means. The same elements as those shown in FIG. 8 are denoted by the same numerical references, and explanation for them is omitted.

The data storage unit 101 stores the identification number (ID) of the transmitting wireless station 2000, a transmit timing sequence (Hs), a transmit timing sequence period (Ht), the focused code number (Hn_t) of the transmit timing sequence, the number of slots (Fslot) in a time frame, a time frame (Ftime), transmit clock information (clock_t) which is phase information of the transmitting wireless station 2000, and the transmit timing sequence readout count (Hs_num_t). The data storage unit 101 also stores the total number (Hc) of transmit timing sequences, the codes (Code) used to generate a random sequence, a set of generator polynomials (Rmath), random sequences (Rs), and a random sequence mapping table (Rtable). Examples of the codes used to generate random sequences include Reed-Solomon code (RS code), one-coincidence code (OCC), and Einarsson code. The set of the generator polynomials (Rmath) includes the same number (Hc) of generator polynomials as the transmit timing sequences. A set of generator polynomials is provided for each code applied to generation of random sequences. The random sequences (Rs) are pseudo random sequences generated by the applied code.

The random sequence mapping table (Rtable) describes Hc random sequences (Rs) provided corresponding to each code employed, where Hc is the number of transmit timing sequences. FIG. 13 illustrates an example of the random sequence mapping table (Rtable) for RS code. The table includes a set of (Hc) generator polynomials (Rmath) and Hc random sequences (Rs) generated by the associated polynomials.

The random value selector 2001 reads the ID of the transmitting wireless station 2000 and the total number (Hc) of transmit timing sequences, and selects a random value (R) based on the ID and the total number (Hc). For example, the random value selector 2001 divides the ID number of the transmitting wireless station 2000 by the total number (Hc) of transmit timing sequences and adds "1" to the remainder of the division to produce one of the random values (R) residing between 1 and Hc. The random value selector 2001 outputs the selected random value (R) to the random sequence estimator 2002.

The random sequence estimator 2002 reads a code to be applied to generation of random sequences (Rs) from among the codes stored in the data storage unit 101, and further reads the R-th generator polynomial corresponding to the selected random value (R) from the set of the generator polynomials (Rmath). Then, the random sequence estimator 2002 computes a random sequence (Rs) using the selected generator polynomial. The computed random sequence (Rs) is stored in the data storage unit 101. Alternatively, the random sequence estimator 2002 reads the random sequence mapping table (Rtable) from the data storage unit 101 to read the R-th random sequence (Rs) corresponding to the selected random value (R). The random sequence (Rs) read from the table (Rtable) is stored in the data storage unit 101.

The transmit timing estimator 2003 reads the random sequence (Rs), the number of slots (Fslot) in a time frame, and the time frame (Ftime) from the data storage unit 101. The transmit timing estimator 2003 divides the products of the random sequence (Rs(n), where n is the element number ranging from 1 to Hc) and the time frame (Ftime) by the number of slots (Fslot) in a time frame to produce a value Rs(n)*Ftime/Fslot. This value Rs(n)*Ftime/Fslot is added to (n−1) times the time frame (n−1)*(Ftime). This addition result is a transmit timing sequence Hs(n), where n is an element number ranging from 1 to Hc. The estimated transmit timing sequence is stored in the data storage unit 101.

In general, the transmit clock information (clock_t) differs among the transmitting wireless stations. Accordingly, the random value selector 2001 may be adapted to select a random value (R) using a common value such that the selected random values become the same among the multiple transmitting wireless stations. In this case, the random sequence for each of the transmitting wireless stations 2000 becomes the same; however, the transmit clock information (clock_t) differs among the transmitting wireless stations 2000. Accordingly, the transmit timing sequence (Hs) estimated by the transmit timing estimator 2003 of each transmitting wireless station 2000 differs.

Figure 14:
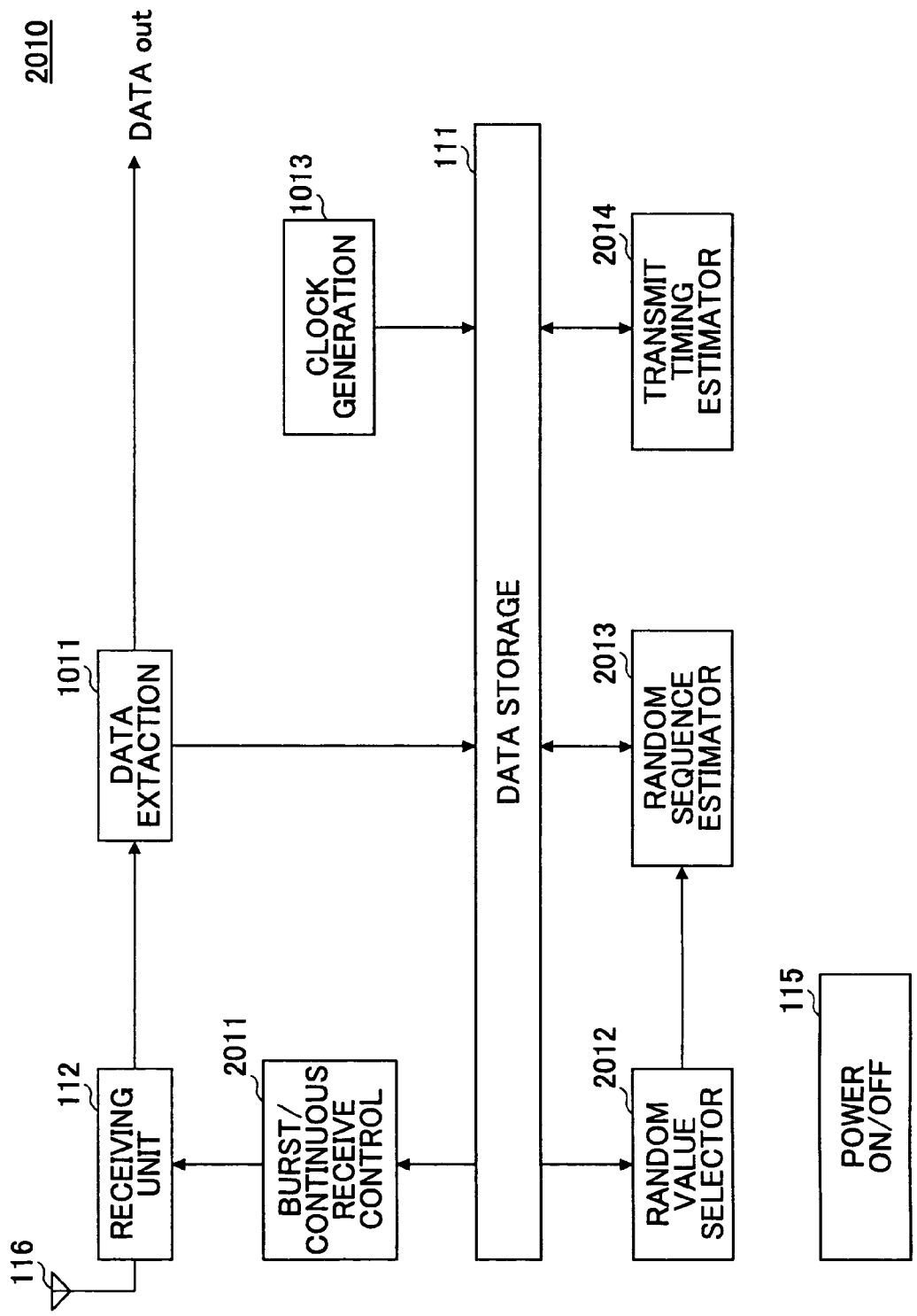
FIG. 14 is a schematic block diagram of the receiving wireless station according to the second embodiment of the invention.

FIG. 14 is a schematic block diagram of the receiving wireless station 2010 according to the second embodiment of the invention. The receiving wireless station 2010 has a data storage unit 111, a receiving unit 112, a power on/off unit 115, an antenna 116, a data extracting unit 1011, a clock generating unit 1013, and a burst/continuous receive control unit 2011 which functions as synchronizing means. The receiving wireless station 2010 further includes a random value selector 2012, a random sequence estimator 2013, and a transmit timing estimator 2014, which structure timing sequence acquiring means. The same elements as those shown in FIG. 9 are denoted by the same numerical references.

The data storage unit 111 stores the identification number (ID) of each transmitting wireless station, a transmit timing sequence (Hs), a transmit timing sequence period (Ht), the focused code number (Hn_r) of the transmit timing sequence, receive clock information (clock_r), transmit timing sequence readout count (Hs_Num_r), and time frame (Ftime). The data storage unit 111 also stores phase-related receive clock information (clock_r) representing phase information of the receiving wireless station 2010, clock offset (clock_d), the total number (Hc) of transmit timing sequences, codes used to generate a random sequence, a set of generator polynomials (Rmath), random sequences (Rs), a random sequence mapping table (Rtable), continuous receive time (Ctime), and continuous receive occurrence interval (Cinterval).

The clock offset (clock_d) represents the difference between transmit clock information (clock_t) and receive clock information (clock_r), which is acquired by subtracting the receive clock information (clock_r) from the transmit clock information (clock_t). The continuous receive time (Ctime) represents time in which the receiving wireless station 2010 is searching for an unknown transmitting wireless station 2000. The continuous receive occurrence interval (Cinterval) represents the time interval between the searching time periods. The continuous receive time (Ctime) and the continuous receive occurrence interval (Cinterval) may be received via a network or through manipulation by the user, instead of saving them in advance in the data storage unit 111.

The burst/continuous receive control unit 2011 supplies an instruction for receiving data during the continuous receive time (Ctime) to the receiving unit 112 after every continuous receive occurrence interval (Cinterval) in order to confirm if there is any unknown transmitting wireless station 2000 existing within the communicating rage of the receiving wireless station 2010.

Other than the continuous receive time (Ctime), the burst/continuous receive control unit 2011 reads the transmit timing sequence (Hs), the transmit timing sequence period (Ht), the focused code number (Hn_r) of the transmit timing sequence, the time frame (Ftime), the receive clock information (clock_r), and the transmit timing sequence readout count (Hs_num_r) out of the data storage unit 111. The burst/continuous receive control unit 2011 adds the current code value corresponding to the focused code number (Hn_r) of the transmit timing sequence (Hs) to the product (Hs_num_r× Ftime×Ht) obtained from the transmit timing sequence readout count (Hs_num_r), the time frame (Ftime), and the transmit timing sequence period (Ht). The receive/continuous control unit 2011 compares the sum (or the addition result) with the receive clock information (clock_r). If these two are the same, the burst/continuous receive control unit 2011 generates and supplies an await instruction to the receiving unit 112. If the two values are not consistent with each other, the burst/continuos receive control unit 2011 does not generate the await instruction.

If the addition result agrees with the receive clock information (clock_r), the burst/continuous receive control unit 2011 increments or adds "1" to the focused code number (Hn_r) of the transmit timing sequence. If the focused code number (Hn_r) of the transmit timing sequence reaches or exceeds the transmit timing sequence period (Ht) as a result of the increment, then the burst/continuous receive control unit 2011 subtracts the transmit timing sequence period (Ht) from the incremented current code value (Hn_r) of the transmit timing sequence, and uses this subtraction result as the updated focused code number (Hn_r) of the transmit timing sequence for the subsequent process. In addition, the burst/continuous receive control unit 2011 adds "1" to the transmit timing sequence readout count (Hs_num_r), and uses the incremented value as the new transmit timing sequence readout count (Hs_num_r) for the subsequent process.

The random value selector 2012 reads the ID of the transmitting wireless station and the total number (Hc) of transmit timing sequences, and selects a random value (R) based on the ID and the total number (Hc). Like the random value selector 2001 of the transmitting wireless station 2000, the random value selector 2012 divides the transmitting wireless station ID by the total number (Hc) of transmit timing sequences and adds "1" to the remainder of the division to produce one of the random values (R) residing between 1 and Hc. The random value selector 2012 outputs the selected random value (R) to the random sequence estimator 2013.

The random sequence estimator 2013 reads a code to be applied to generation of random sequences (Rs) from among the codes stored in the data storage unit 111, and further reads the R-th generator polynomial corresponding to the selected random value (R) from the set of the generator polynomials (Rmath). Then, the random sequence estimator 2013 computes a random sequence (Rs) using the selected generator polynomial. The computed random sequence (Rs) is stored in the data storage unit 111. Alternatively, the random sequence estimator 2013 reads the random sequence mapping table (Rtable) from the data storage unit 111 to read the R-th random sequence (Rs) corresponding to the selected random value (R). The random sequence (Rs) read from the table (Rtable) is stored in the data storage unit 111.

The transmit timing estimator 2014 estimates a clock offset (clock_d) using the random sequence (Rs) stored in the data storage unit 111 and the time interval of the data received from the transmitting wireless station 2000, and further estimates a transmit timing sequence (Hs). For example, the transmit timing estimator 2014 estimates a time interval sequence for receiving data from the transmitting wireless station 2000 from the random sequence (Rs). Then, the transmit timing estimator 2014 compares the estimated time interval sequence with the actual data receiving interval sequence obtained when actually receiving the data from the transmitting wireless station 2000, and estimates the transmit clock information (clock_t) from the difference between the estimation and the actual value. The estimated transmit clock information (clock_t) is stored in the data storage unit 111. Then transmit timing estimator 2014 subtracts the estimated transmit clock information (clock_t) from the receive clock information (clock_r) stored in the data storage unit 111, and stores the subtraction result (or the difference) as the clock offset (clock_d) in the data storage unit 111. Furthermore, the transmit timing estimator 2014 divides the products of the random sequence (Rs(n), where n is the element number ranging from 1 to Hc) and the time frame (Ftime) by the number of slots (Fslot) in a time frame to produce a value Rs(n)*Ftime/Fslot. This value Rs(n)*Ftime/Fslot is added to (n−1) times the time frame (n−1)*(Ftime). This addition result is a transmit timing sequence Hs, which is then stored in the data storage unit 111.

Next, explanation is made of the operations of the transmitting wireless station and the receiving wireless station of the second embodiment, with reference to the flowcharts.

Figure 15:
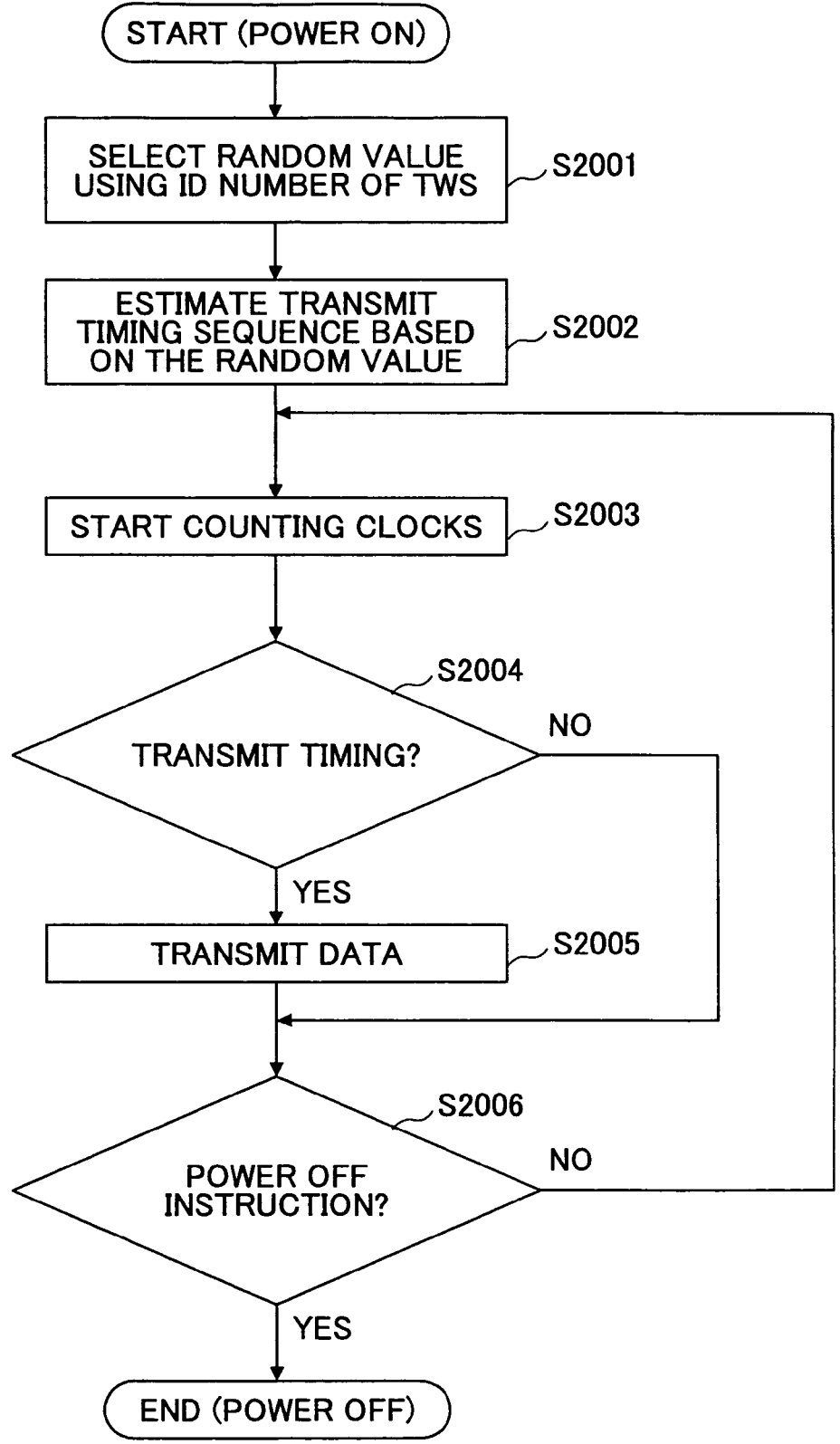
FIG. 15 is a flowchart of the operations carried out by the transmitting wireless station according to the second embodiment of the invention.

FIG. 15 is a flowchart showing the operations executed by the transmitting wireless station 2000 according to the second embodiment. When the power on/off unit 106 turns on the internal circuits of the transmitting wireless station 2000 in response to an externally supplied instruction, the random value selector 2001 reads the ID number of the transmitting wireless station and the total number (Hc) of transmit timing sequences out of the data storage unit 101, and selects a random value (R) using these values (step S2001).

The random sequence estimator 2002 estimates a random sequence (Rs) using the selected random value (R). The transmit timing estimator 2003 estimates a transmit timing sequence (Hs) using the estimated random sequence (Rs) (step S2002).

Then, the clock generating unit 1002 starts counting clocks, and stores the count value as the transmit clock information (clock_t) in the data storage unit 101 (step S2003).

The burst transmission control unit 1001 determines whether it is at data transmit timing (step S2004). To be more precise, the burst transmission control unit 1001 reads the transmit timing sequence (Hs), the transmit timing sequence period (Ht), the focused code number (Hn_t) of the transmit timing sequence, the time frame (Ftime), the transmit clock information (clock_t), and the transmit timing sequence readout count (Hs_num_t) out of the data storage unit 101. The burst transmission control unit 1001 adds the current code value corresponding to the focused code number (Hn_t) of the transmit timing sequence (Hs) to the product (Hs_num_t× Ftime×Ht) obtained from the transmit timing sequence readout count (Hs_num_t), the time frame (Ftime), and the transmit timing sequence period (Ht). The burst transmission control unit 1001 compares the sum (or the addition result) with the transmit clock information (clock_t). If these two are the same, the burst transmission control unit 1001 determines that it is at transmit timing (YES in S2004), and supplies a switch-on instruction to the switch 105. If the addition result does not agree with the transmit clock information, the burst transmission control unit 1001 determines that it is not at data transmit timing (NO in S2004). In this case, the switch-on instruction is not generated, and the process proceeds to step S2006.

If the determination result is affirmative (YES in S2004), the transmitting unit 1003 outputs the input data and the ID of the transmitting wireless station 2000 read out from the data storage unit 101. Since the switch 105 is ON in response to the instruction from the burst transmission control unit 1001, the data and the ID are transmitted from the antenna 107 (step S2005).

After the data transmission (S2005), or after the negative determination as to the transmit timing (NO in S2004), the power on/off unit 106 determines whether a power-off instruction has been received externally (step S2006). If no power-off instruction has been received (NO in S2006), the steps from S2003 to S2005 are repeated. Upon the power-off instruction (YES in S2006), the power on/off unit 106 turns off the internal circuits of the transmission wireless station 2000, and the process terminates.

Figure 16:
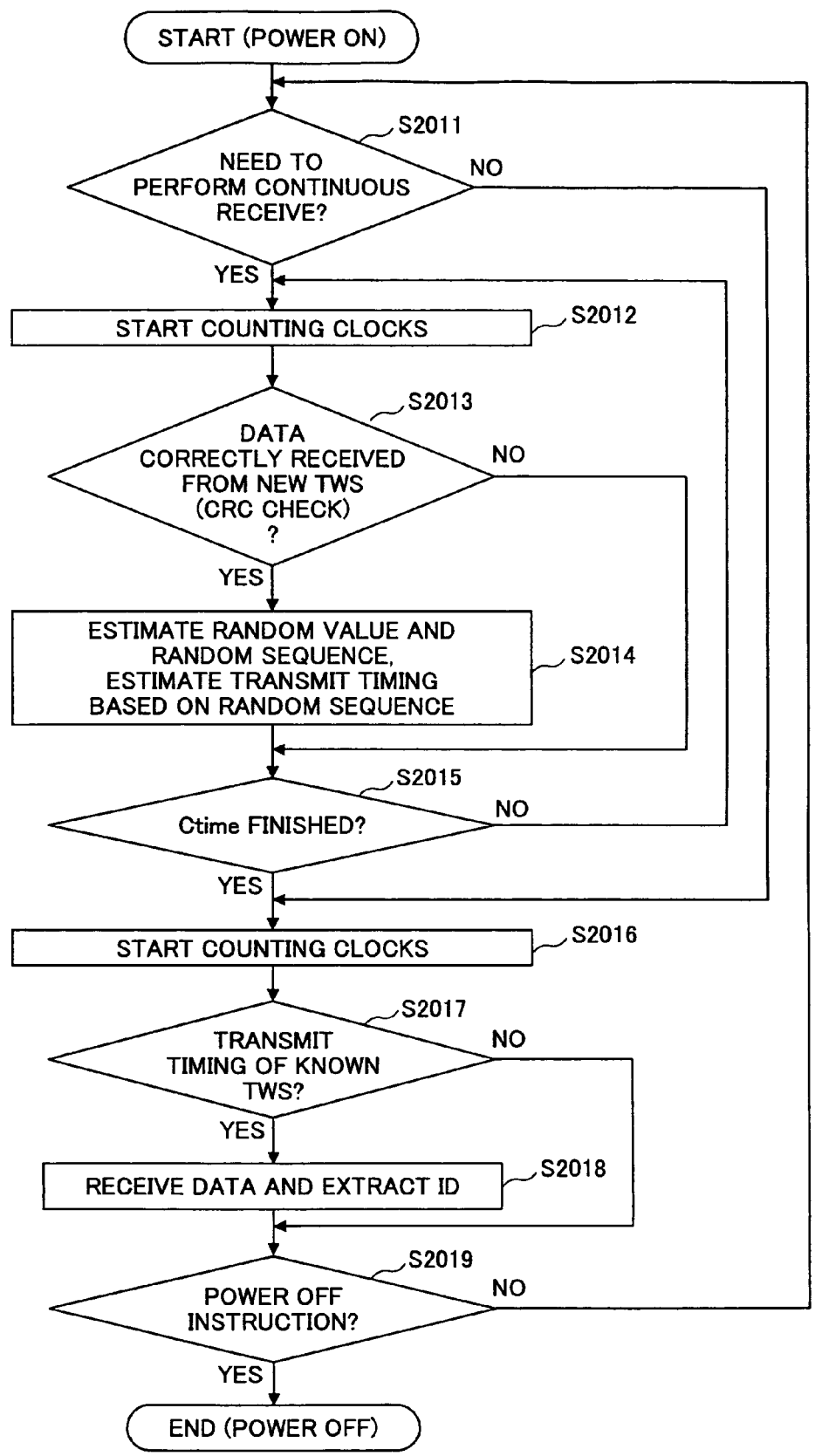
FIG. 16 is a flowchart of the operations carried out by the receiving wireless station according to the second embodiment of the invention.

FIG. 16 is a flowchart showing the operations executed by the receiving wireless station 2010 according to the second embodiment. When the power on/off unit 115 turns on the internal circuits of the receiving wireless station 2010 in response to an externally supplied instruction, the burst/continuous receive control unit 2011 determines whether it is necessary to perform continuous receive in order to confirm if any unknown transmitting wireless station 2000 exists within the communicating range of the receiving wireless station 2010 (step S2011).

If it is necessary to perform continuous receive (YES in S2011), the clock generating unit 1013 starts counting clocks, and stores the count value as the receive clock information (clock_r) in the data storage unit 111 (step S2012). The receiving unit 112 receives data from the new transmitting wireless station 2000 via the antenna 116, and performs a CRC check to determine whether the data have been received correctly (step S2013).

If data have been received correctly (YES in S2013), the receiving unit 112 supplies the received data to the data extracting unit 1011. The data extracting unit 1011 separates the ID number of the transmitting wireless station 2000 from the received data, and stores the extracted ID number in the data storage unit 111, while outputting the other components of the received data externally. Then, the random value selector 2012 reads the ID number of the transmitting wireless station 2000 and the total number (Hc) of transmit timing sequences out of the data storage unit 111 to select a random value (R) using these values. The random sequence estimator 2013 estimates a random sequence (Rs) using the selected random value (R). The transmit timing estimator 2014 estimates a transmit timing sequence (Hs) using the estimated random sequence (Rs), and stores the transmit timing in the data storage unit 111 (step S2014).

After the estimation of transmit timing sequence (Hs) in step S2014 or after the negative determination as to correct receiving of data (NO in S2013), the burst/continuous receive control unit 2011 determines whether the continuous receive time (Ctime) is finished (step S2015).

If the continuous receive time (Ctime) is finished (YES in S2015), or if it is determined that continuous receive is unnecessary in step S2011, the clock generating unit 1013 starts counting clocks, and stores the count value as the receive clock information (clock_r) in the data storage unit 111 (step S2016).

Then, the burst/continuous receive control unit 2011 determines whether it is at data transmit timing for any known transmitting wireless station 2000, based on the transmit timing sequences (Hs) of all the known transmitting wireless stations 2000 and the receive clock information (clock_r) stored in the data storage unit 111 (step S2017). If any known transmitting wireless station is at data receive timing (YES in S2017), the receiving unit 112 receives data from the corresponding transmitting wireless station 2000 via the antenna 116 and performs a CRC check. When the data have been received correctly, the receiving unit 112 supplies the received data to the data extracting unit 1011. The data extracting unit 1011 separates the transmitting wireless station ID from the received data, and stores the transmitting wireless station ID, while outputting the other components of the received data externally (step S2018).

After the data separation (S2018) or after the negative determination as to the transmit timing of any known transmitting wireless station (NO in S2017), the power on/off unit 115 determines whether a power-off instruction has been received externally (step S2019). If no power-off instruction has been received (NO in S2019), the steps from S2011 to S2018 are repeated. Upon receiving the power-off instruction (YES in S2019), the power on/off unit 115 turns off the internal circuits of the receiving wireless station 2010, and the process terminates.

Third Embodiment

Figure 17:
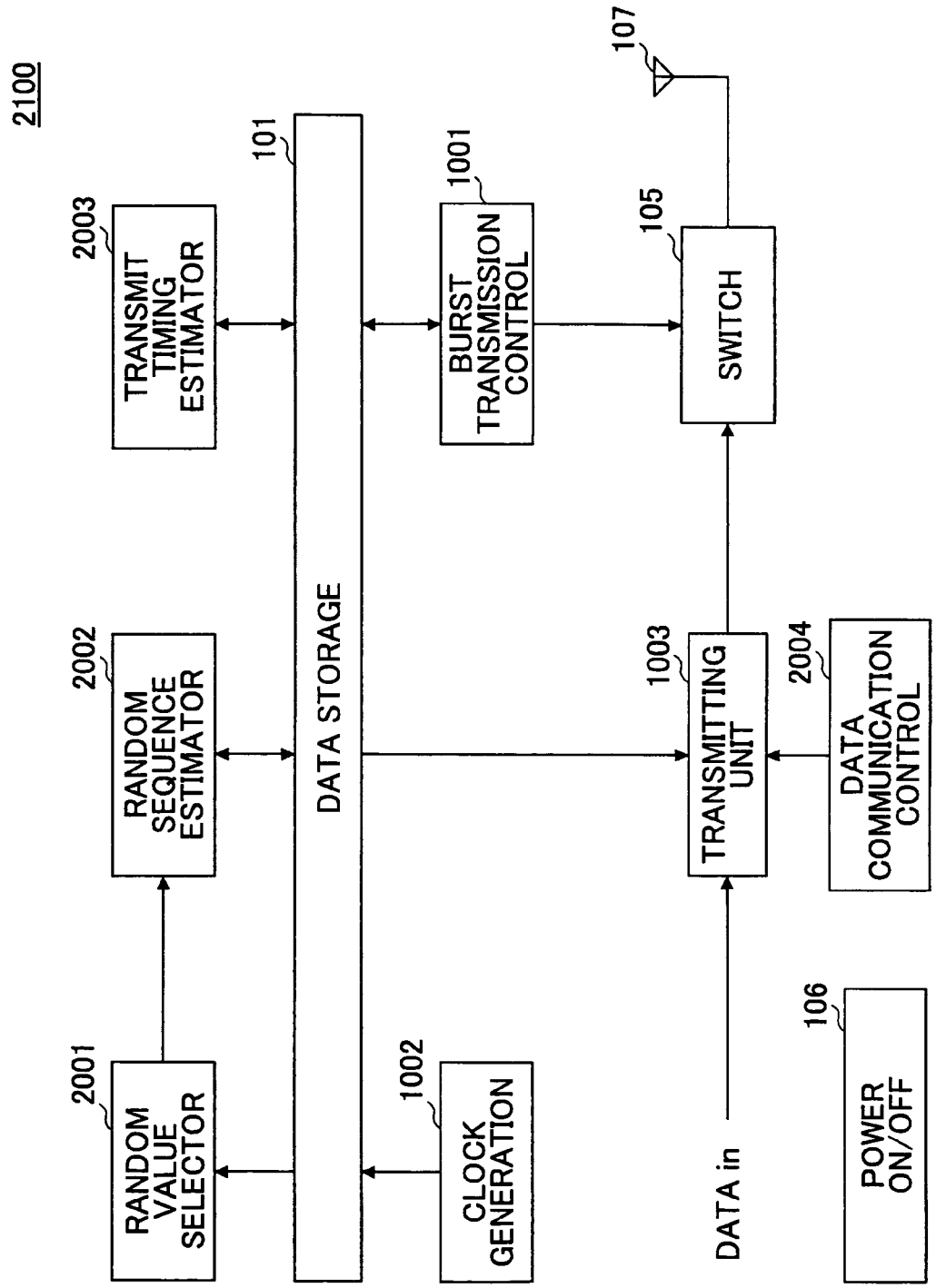
FIG. 17 is a schematic block diagram of the transmitting wireless station according to the third embodiment of the invention.

FIG. 17 is a schematic block diagram of the transmitting wireless station 2100 according to the third embodiment of the invention. The transmitting wireless station 2100 includes a data storage unit 101, a switch 105, a power on/off unit 106, an antenna 107, and a burst transmission control unit 1001, a clock generating unit 1002, a transmitting unit 1003, a random value selector 2001, a random sequence estimator 2002, a transmit timing estimator 2003, and a data communication control unit 2004. The random value selector 2001, the random sequence estimator 2002 and the transmit timing estimator 2003 structure transmit timing sequence acquiring means. The same elements as those shown in FIG. 12 are denoted by the same numerical references, and explanation for them is omitted.

The transmitting unit 1003 is connected to the antenna 107 via the switch 105 so as to transmit the identification number (ID) of the transmitting wireless station 2100 and the focused code number (Hn_t) of the transmit timing sequence. The data communication control unit 2004 changes the packet structure of a packet to be transmitted from the transmitting unit 1003 according to a prescribed condition. Examples of the packet structure include a structure for constantly transmitting input data, the transmitting wireless station ID and the focused code number (Hn_t) of transmit timing sequence, a structure for discontinuously transmitting input data and the focused code number (Hn_t) of transmit timing sequence, and a structure for randomly transmitting input data and the focused code number (Hn_t) of transmit timing sequence.

The transmitting unit 1003 changes the structure of the packet to be transmitted under the control of the data communication control unit 2004. For instance, if the data communication control unit 2004 controls such that the focused code number (Hn_t) of transmit timing sequence is to be transmitted every other time, the transmitting unit 1003 first generates and transmits a first packet including input data and the transmitting wireless station ID, and then generates and transmits a second packet including input data, the transmitting wireless station ID and the focused code number (Hn_t) of transmit timing sequence. The transmitting unit 1003 repeats this packet transmission order.

Figure 18:
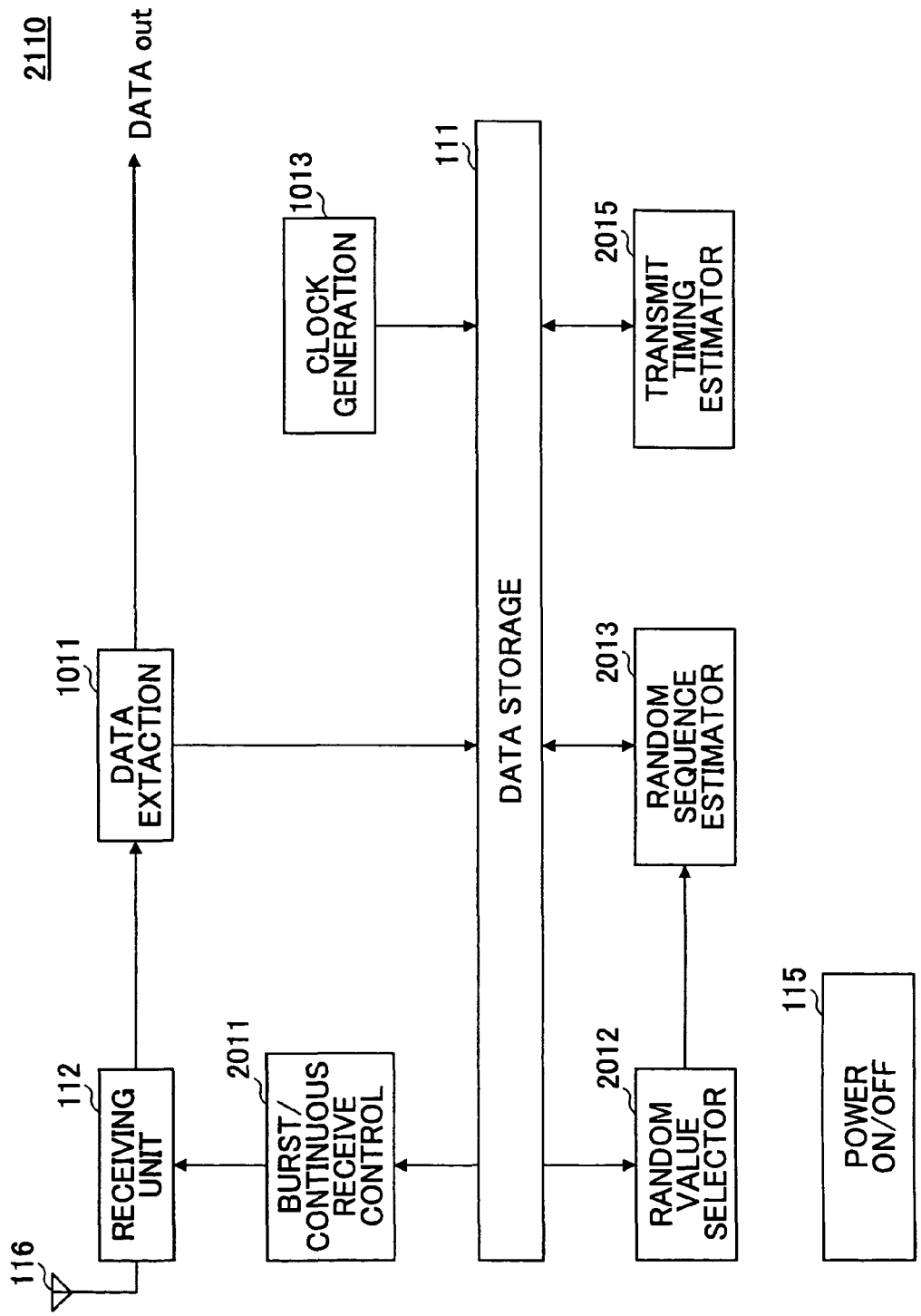
FIG. 18 is a schematic block diagram of the receiving wireless station according to the third embodiment of the invention.

FIG. 18 is a schematic block diagram of the receiving wireless station 2110 according to the third embodiment of the invention. The receiving wireless station 2110 has a data storage unit 111, a receiving unit 112, a power on/off unit 115, an antenna 116, a data extracting unit 1011, a clock generating unit 1013, and a burst/continuous receive control unit 2011 which functions as synchronizing means. The receiving wireless station 2110 further includes a random value selector 2012, a random sequence estimator 2013, and a transmit timing estimator 2015, which structure transmit timing sequence acquiring means. The same elements as those shown in FIG. 14 are denoted by the same numerical references.

The data extracting unit 1011 separates the transmitting wireless station ID and the focused code number (Hn_t) of transmit timing sequence from the input data, and stores the extracted ID and the focused code number (Hn_t) of transmit timing sequence in the data storage unit 111, while externally outputting the other components of the input data.

The transmit timing estimator 2015 determines the offset (clock_d) of the clock based on the random sequence (Rs) stored in the data storage unit 111 and the focused code number (Hn_t) of transmit timing sequence transmitted from the wireless transmitting station 2100, and estimates a transmit timing sequence (Hs). For example, the transmit timing estimator 2015 inserts the focused code number (Hn_t) of transmit timing of the transmitting wireless station 2100 into the focused code number (Hn_r) of transmit timing sequence of the receiving wireless station 2110 stored in the data storage unit 111. If the focused code number (Hn_r) of transmit timing sequence of the receiving wireless station 2110 corresponds to the receive clock information (clock_r) acquired when receiving the focused code number (Hn_r) of transmit timing sequence, the transmit timing estimator 2015 estimates a transmit timing sequence (Hs) by determining time required for packets containing the focused code number (Hn_r) of transmit timing sequence to arrive starting from the first packet until the end of the transmit timing sequence period (Ht), using the random sequence (Rs). The estimated transmit timing sequence (Hs) is stored in the data storage unit 111.

The operations of the transmitting wireless station 2100 and the receiving wireless station 2110 are almost the same as those shown in FIG. 15 and FIG. 16, except for several points. In step S2005, the transmitting unit 1003 of the transmitting wireless station 2100 outputs input data, together with the transmitting wireless station ID and the focused code number (Hn_t) of the transmit timing sequence read out from the data storage unit 101. In step S2014, the data extracting unit 1011 of the receiving wireless station 2110 separates the transmitting wireless station ID and the focused code number (Hn_t) of the transmit timing sequence from the input data, and stores the ID and the focused code number (Hn_t) in the data storage unit 111, while outputting the other components of the input data externally. The transmit timing estimator 2015 inserts the focused code number (Hn_t) of the transmit timing sequence received from the transmitting wireless station 2100 into the focused code number (Hn_r) stored in the data storage unit 111, and estimates a transmit timing sequence (Hs) using the random sequence (Rs).

Fourth Embodiment

Figure 19:
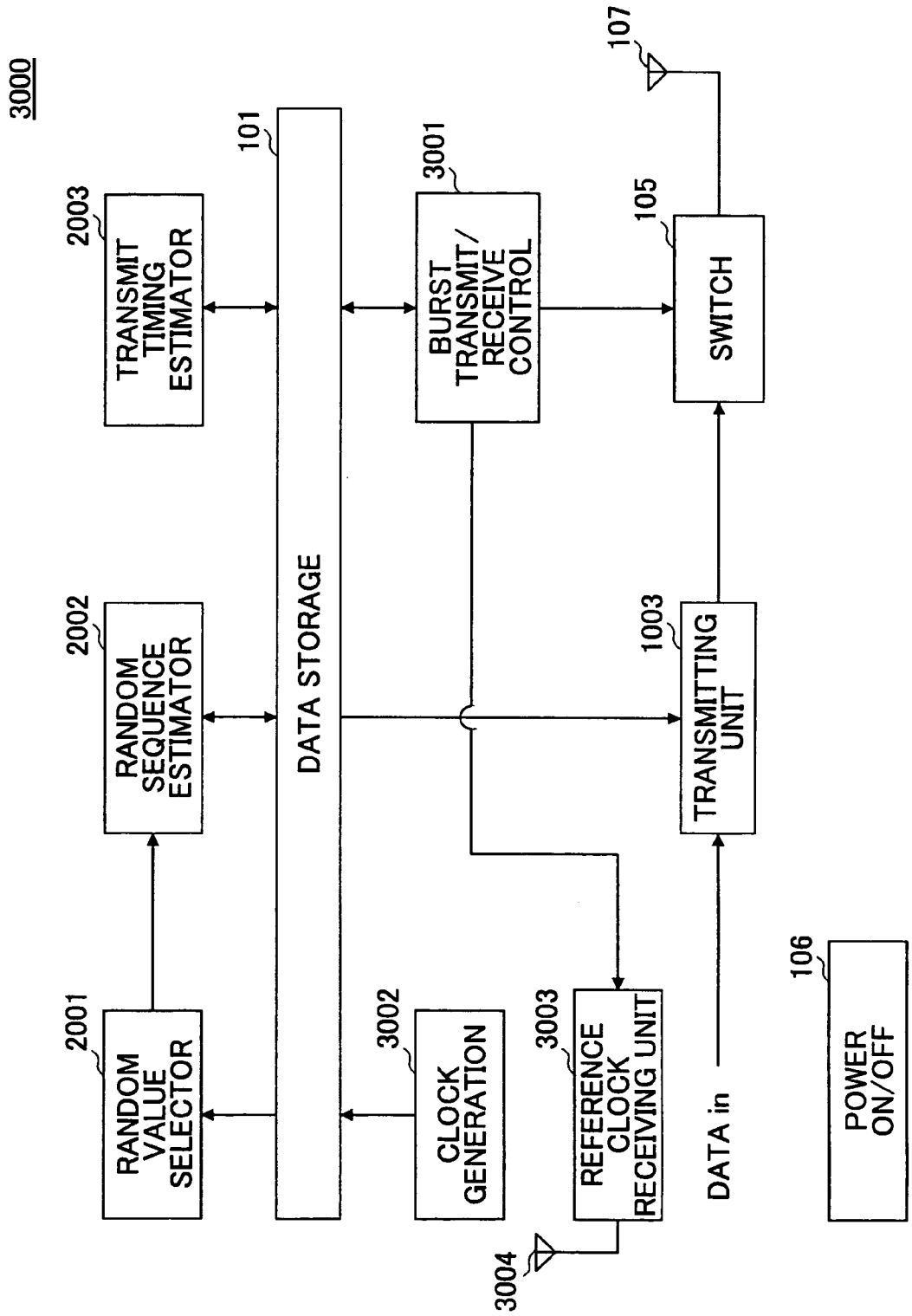
FIG. 19 is a schematic block diagram of the transmitting wireless station according to the fourth embodiment of the invention.

FIG. 19 is a schematic block diagram of the transmitting wireless station 3000 according to the fourth embodiment of the invention. The transmitting wireless station 3000 includes a data storage unit 101, a switch 105, a power on/off unit 106, an antenna 107, a transmitting unit 1003, a random value selector 2001, a random sequence estimator 2002, and a transmit timing estimator 2003. The transmitting wireless station 3000 also includes a burst transmit/receive control unit 3001 functioning as transmission control means, a clock generating unit 3002 functioning as phase information correcting means, a reference clock receiving unit 3003, and another antenna 3004. The same elements as those shown in FIG. 12 are denoted by the same numerical references, and explanation for them is omitted.

The data storage unit 101 stores the identification number (ID) of the transmitting wireless station 3000, a transmit timing sequence (Hs), a transmit timing sequence period (Ht), the focused code number (Hn_t) of the transmit timing sequence, the number of slots (Fslot) in a time frame, a time frame (Ftime), transmit clock information (clock_t) which is phase information of the transmitting wireless station 3000, and the transmit timing sequence readout count (Hs_num_t). The data storage unit 101 also stores the total number (Hc) of transmit timing sequences, the codes (Code) used to generate a random sequence, a set of generator polynomials (Rmath), random sequences (Rs), a random sequence mapping table (Rtable), external reference clock receiving interval (Sinterval), and external reference clock continuous receive time (Stime). The external reference clock receiving interval (Sinterval) represents the time interval between time periods for searching for external reference clocks as the phase information used as the reference. The external reference clock continuous receive time (Stime) represents a time period for searching for the external reference clock.

The burst transmit/receive control unit 3001 reads the transmit timing sequence (Hs), the transmit timing sequence period (Ht), the current number (Hn_t) of the transmit timing sequence, the time frame (Ftime), the transmit clock information (clock_t), and the transmit timing sequence readout count (Hs_num_t). The burst transmit/receive control unit 3001 adds the current code value corresponding to the focused code number (Hn_t) of the transmit timing sequence (Hs) to the product (Hs_num_t×Ftime×Ht) of the transmit timing sequence readout count (Hs_num_t), the time frame (Ftime), and the transmit timing sequence period (Ht). The burst transmit/receive control unit 3001 compares the sum (or the addition result) with the transmit clock information (clock_t). If these two are the same, the burst transmit/receive control unit 3001 supplies a switch-on instruction to the switch 105. If the two values are not consistent with each other, the burst transmit/receive control unit 1001 does not generate the switch-on instruction.

If the addition result agrees with the transmit clock information (clock_t), the burst transmit/receive control unit 3001 increments or adds "1" to the focused code number (Hn_t) of the transmit timing sequence. When the incremented value of the focused code number (Hn_t) of the transmit timing sequence reaches or exceeds the transmit timing sequence period (Ht), the burst transmit/receive control unit 3001 subtracts the transmit timing sequence period (Ht) from the focused code number (Hn_t) of the transmit timing sequence, and uses the subtraction value as the updated focused code number (Hn_t) of the transmit timing sequence for the subsequent process. In addition, the burst transmit/receive control unit 3001 adds "1" to the transmit timing sequence readout count (Hs_num_t), and uses the incremented value as the new readout count (Hs_num_t) of the transmit timing sequence for the subsequent process.

The burst transmit/receive control unit 3001 reads the external reference clock receiving interval (Sinterval) and the external reference clock continuous receive time (Stime) from the data storage unit 101, and determines whether it is time to receive an external reference clock, based on the readout values. If it is time to receive an external reference clock, the burst transmit/receive control unit 3001 instructs the reference clock receiving unit 3003 to receive external reference clocks. In response to the instruction, the reference clock receiving unit 3003 receives the external reference clock indicating a reference clock time from the antenna 3004, which clock is used as reference clock information (Clock_s).

The clock generating unit 3002 corrects transmit clock information (clock_t) being generated based on the reference clock information (Clock_s). The corrected transmit clock information (clock_t) is stored in the data storage unit 101.

Figure 20:
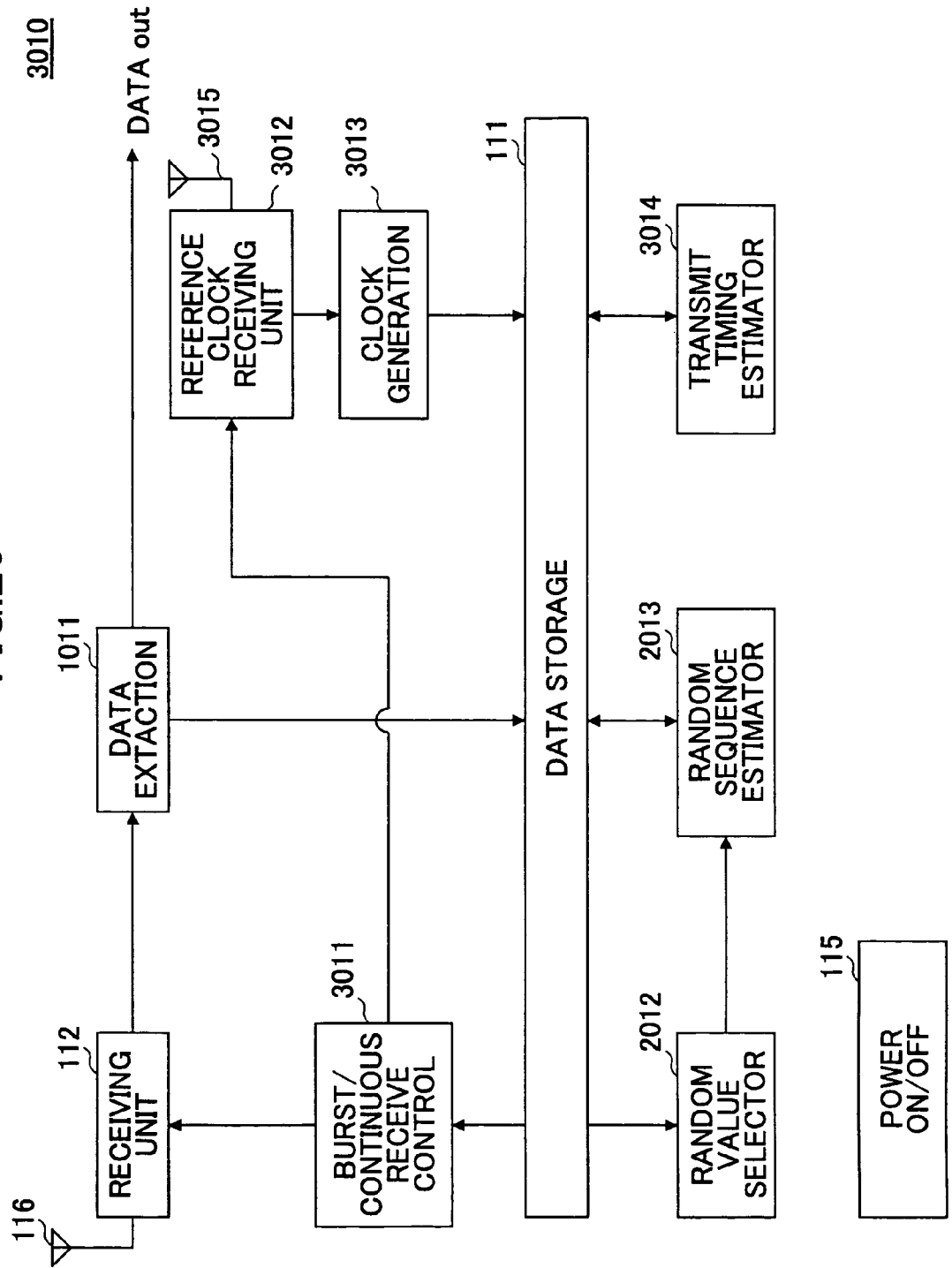
FIG. 20 is a schematic block diagram of the receiving wireless station according to the fourth embodiment of the invention.

FIG. 20 is a schematic block diagram of the receiving wireless station 3010 according to the fourth embodiment of the invention. The receiving wireless station 3010 has a data storage unit 111, a receiving unit 112, a power on/off unit 115, an antenna 116, a data extracting unit 1011, a random value selector 2012, a random sequence estimator 2013, a burst/continuous receive control unit 3011 functioning as synchronizing means, a reference clock receiving unit 3012, a clock generating unit 3013 functioning as phase information correcting means, transmit timing estimator 3014 functioning as transmit timing acquiring means, and another antenna 3015. The same elements as those shown in FIG. 14 are denoted by the same numerical references.

The data storage unit 111 stores the identification number (ID) of each transmitting wireless station 3000, a transmit timing sequence (Hs), a transmit timing sequence period (Ht), the focused code number (Hn_r) of the transmit timing sequence, receive clock information (clock_r), transmit timing sequence readout count (Hs_Num_r), and time frame (Ftime). The data storage unit 111 also stores phase-related receive clock information (clock_r), transmit clock information (clock_t), clock offset (clock_d), the total number (Hc) of transmit timing sequences, codes used to generate a random sequence, a set of generator polynomials (Rmath), random sequences (Rs), a random sequence mapping table (Rtable), continuous receive time (Ctime), external reference clock receiving interval (Sinterval), and external reference clock continuous receive time (Stime).

The burst/continuous receive control unit 3011 supplies an instruction for receiving data during the continuous receive time (Ctime) to the receiving unit 112 after every continuous receive occurrence interval (Cinterval) in order to confirm if there is any unknown transmitting wireless station 3000 existing within the communicating range of the receiving wireless station 3010.

Other than the continuous receive time (Ctime), the burst/continuous receive control unit 3011 reads the transmit timing sequence (Hs), the transmit timing sequence period (Ht), the focused code number (Hn_r) of the transmit timing sequence, the time frame (Ftime), the receive clock information (clock_r), and the transmit timing sequence readout count (Hs_num_r) out of the data storage unit 111. The burst/continuous receive control unit 3011 adds the current code value corresponding to the focused code number (Hn_r) of the transmit timing sequence (Hs) to the product (Hs_num_r× Ftime×Ht) obtained from the transmit timing sequence readout count (Hs_num_r), the time frame (Ftime), and the transmit timing sequence period (Ht). The burst/continuous receive control unit 3011 compares the sum (or the addition result) with the receive clock information (clock_r). If these two are the same, the burst/continuous receive control unit 3011 generates and supplies an await instruction to the receiving unit 112. If the two values are not consistent with each other, the burst/continuous receive control unit 3011 does not generate the await instruction.

If the addition result agrees with the receive clock information (clock_r), the burst/continuous receive control unit 3011 increments or adds "1" to the focused code number (Hn_r) of the transmit timing sequence. If the focused code number (Hn_r) of the transmit timing sequence reaches or exceeds the transmit timing sequence period (Ht) as a result of the increment, then the burst/continuous receive control unit 3011 subtracts the transmit timing sequence period (Ht) from the incremented current code value (Hn_r) of the transmit timing sequence, and uses this subtraction result as the undated focused code number (Hn_r) of the transmit timing sequence for the subsequent process. In addition, the burst/continuous receive control unit 3011 adds "1" to the transmit timing sequence readout count (Hs_num_r), and uses the incremented value as the new transmit timing sequence readout count (Hs_num_r) for the subsequent process.

The burst/continuous receive control unit 3011 reads the external reference clock receiving interval (Sinterval) and the external reference clock continuous receive time (Stime) from the data storage unit 111, and determines whether it is time to receive external reference clocks, based on the readout values. If it is time to receive external reference clocks, the burst/continuous receive control unit 3011 instructs the reference clock receiving unit 3012 to receive external reference clocks. In response to the instruction, the reference clock receiving unit 3012 receives external reference clocks as the reference clock information (Clock_s), via the antenna 3015.

The clock generating unit 3013 corrects receive clock information (clock_r) being generated based on the reference clock information (Clock_s). The corrected receive clock information (clock_r) is stored in the data storage unit 111.

The transmit timing estimator 3014 reads the random sequence (Rs), the number of slots (Fslot) in a time frame, and the time frame (Ftime) from the data storage unit 111. The transmit timing estimator 3014 divides the products of the random sequence (Rs(n), where n is the element number ranging from 1 to Hc) and the time frame (Ftime) by the number of slots (Fslot) in a time frame to produce a value Rs(n)*Ftime/Fslot. This value Rs(n)*Ftime/Fslot is added to (n−1) times the time frame (n−1)*(Ftime). The addition result is a transmit timing sequence Hs(n), where n is the element number residing in the range from 1 through Hc. The estimated transmit timing sequence (Hs) is stored in the data storage unit 111.

Next, explanation is made of the operations of the transmitting wireless station and the receiving wireless station of the fourth embodiment, with reference to the flowcharts.

Figure 21:
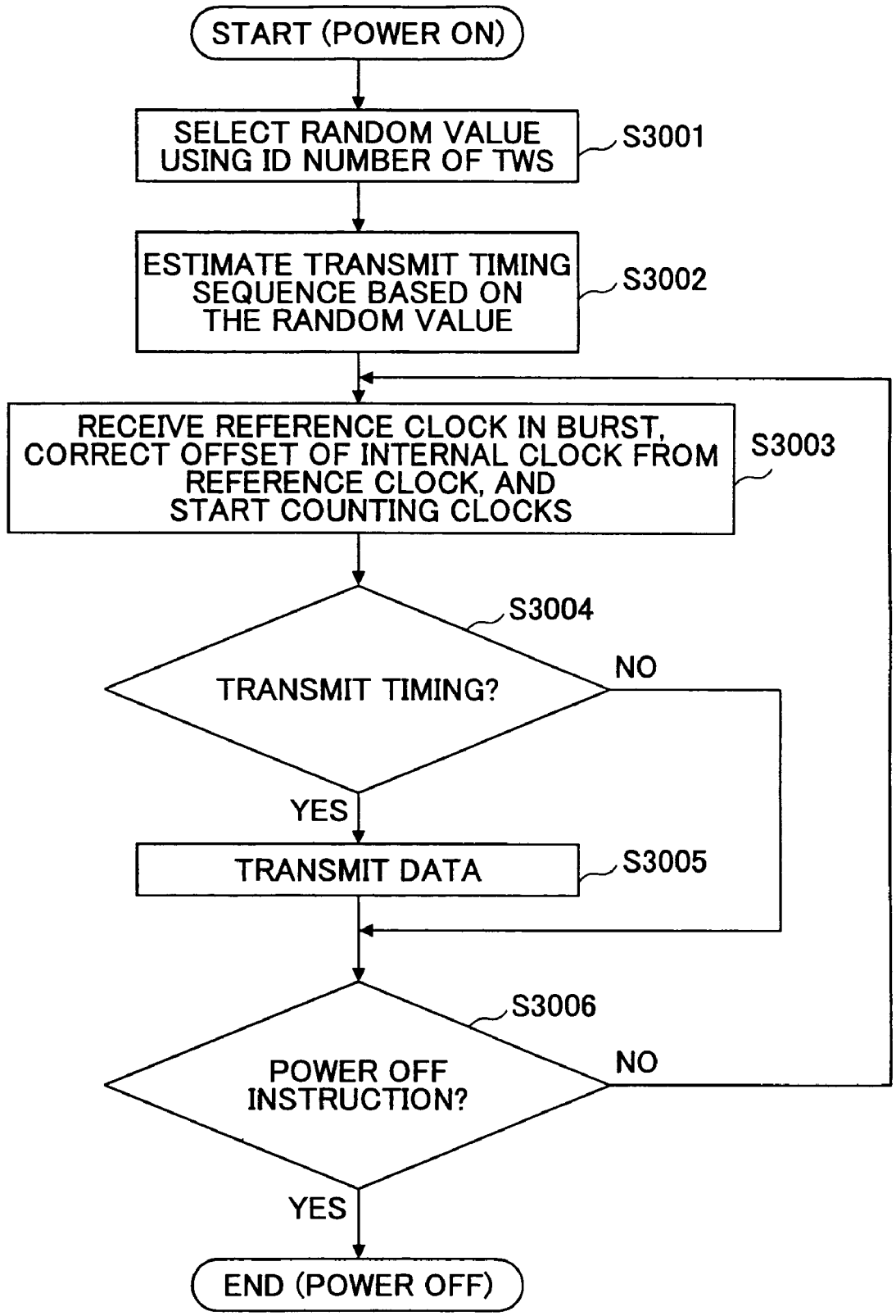
FIG. 21 is a flowchart of the operations carried out by the transmitting wireless station according to the fourth embodiment of the invention.

FIG. 21 is a flowchart showing the operations executed by the transmitting wireless station 3000 according to the fourth embodiment. When the power on/off unit 106 turns on the internal circuits of the transmitting wireless station 3000 in response to an externally supplied instruction, the random value selector 2001 reads the ID number of the transmitting wireless station 3000 and the total number (Hc) of transmit timing sequences out of the data storage unit 101, and selects a random value (R) using the readout values (step S3001).

The random sequence estimator 2002 estimates a random sequence (Rs) using the selected random value (R). The transmit timing estimator 2003 estimates a transmit timing sequence (Hs) using the estimated random sequence (Rs) (step S3002).

Then, the clock generating unit 1002 starts counting clocks, and stores the count value as the transmit clock information (clock_t) in the data storage unit 101 (step S3003).

The burst transmit/receive control unit 3001 instructs the reference clock receiving unit 3003 to receive external reference clocks when it becomes time to receive the external reference clocks. In response to the instruction, the reference clock receiving unit 3003 receives external reference clocks (or the reference clock information (Clock_s)) via the antenna 3004. The clock generating unit 3002 corrects transmit clock information (clock_t) being generated, based on the reference clock information (Clock_s), and starts counting clocks (step S3003).

The burst transmit/receive control unit 3001 determines whether it is at transmit timing (step S3004). To be more precise, the burst transmit/receive control unit 3001 reads the transmit timing sequence (Hs), the transmit timing sequence period (Ht), the current number (Hn_t) of the transmit timing sequence, the time frame (Ftime), the transmit clock information (clock_t), and the transmit timing sequence readout count (Hs_num_t). The burst transmit/receive control unit 3001 adds the current code value corresponding to the focused code number (Hn_t) of the transmit timing sequence (Hs) to the product (Hs_num_t×Ftime×Ht) of the transmit timing sequence readout count (Hs_num_t), the time frame (Ftime), and the transmit timing sequence period (Ht). The burst transmit/receive control unit 3001 compares the sum (or the addition result) with the transmit clock information (clock_t). If these two are the same, the burst transmit/receive control unit 3001 determines that it is at transmit timing and supplies a switch-on instruction to the switch 105 (YES in S3004). If the two values are not consistent with each other, the burst transmit/receive control unit 3001 determines that it is not transmit timing and does not generate the switch-on instruction (NO in S3004).

The transmitting unit 1003 outputs the input data and the transmitting wireless station ID read from the data storage unit 101. Since at transmit timing the switch 105 is closed in response to the switch-on instruction, the data output from the transmitting unit 1003 are transmitted from the antenna 107 (step S3005).

After the data transmission (S3005), or after the negative determination as to the transmit timing (NO in S3004), the power on/off unit 106 determines whether a power-off instruction has been received externally (step S3006). If no power-off instruction has been received (NO in S3006), the steps from S3003 to S3005 are repeated. Upon the power-off instruction (YES in S3006), the power on/off unit 106 turns off the internal circuits of the transmission wireless station 3000, and the process terminates.

Figure 22:
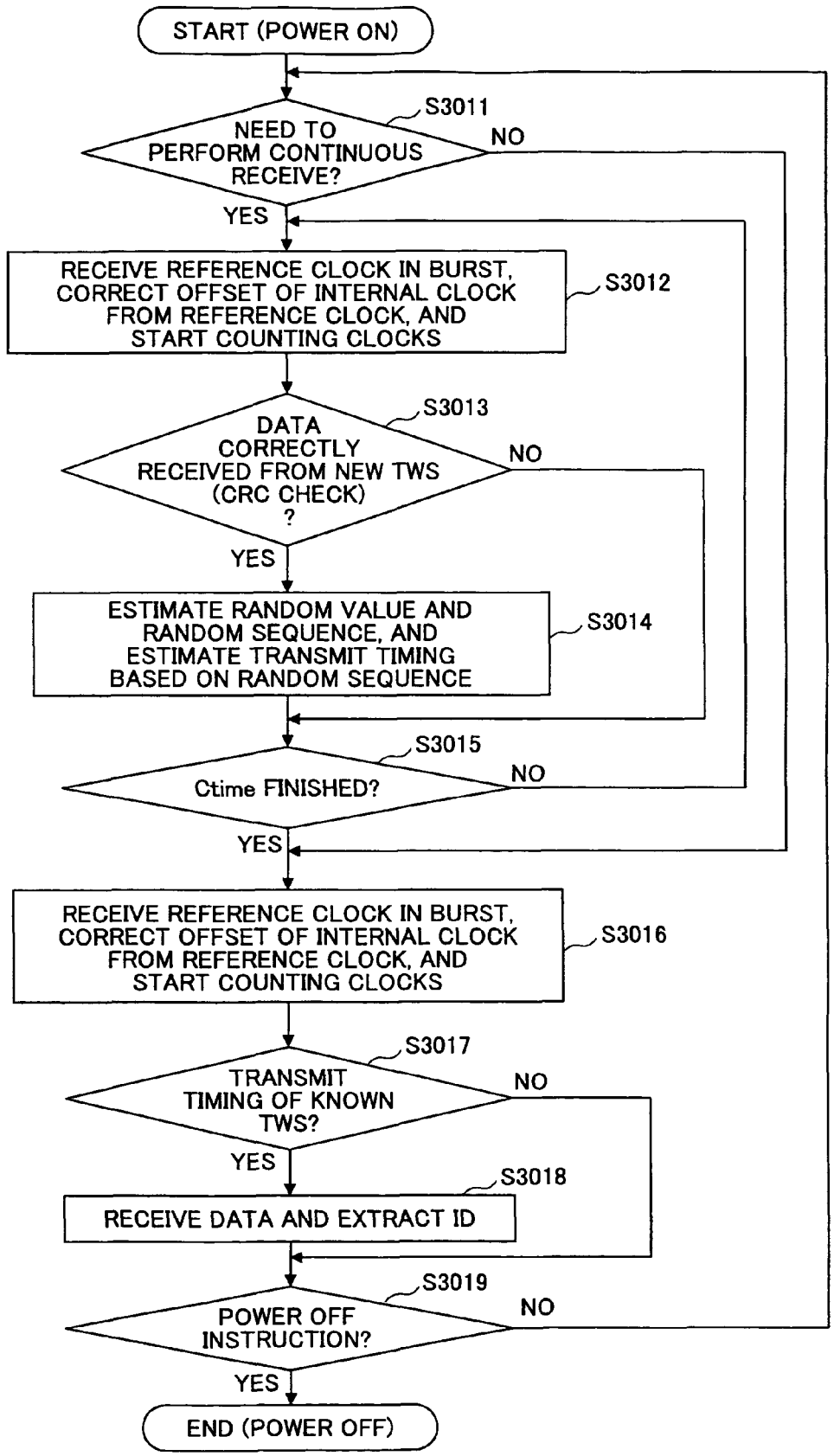
FIG. 22 is a flowchart of the operations carried out by the receiving wireless station according to the fourth embodiment of the invention.

FIG. 22 is a flowchart showing the operations executed by the receiving wireless station 3010 according to the fourth embodiment. When the power on/off unit 115 turns on the internal circuits of the receiving wireless station 3010 in response to an externally supplied instruction, the burst/continuous receive control unit 3011 determines whether it is necessary to perform continuous receive in order to confirm if there is any unknown transmitting wireless station 3000 existing within the communicating range of the receiving wireless station 3010 (step S3011).

If it is necessary to perform continuous receive (YES in S3011), and if it is time to receive external reference clocks, then the burst/continuous receive control unit 3011 instructs the reference clock receiving unit 3012 to receive external reference clocks. In response to the instruction, the reference clocks receiving unit 3012 receives external reference clock (that is, the reference clock information (Clock_s)) via the antenna 3015. The clock generating unit 3013 corrects transmit clock information (clock_t) being transmitted, based on the reference clock information (Clock_s), and starts counting clocks (step S3012).

The receiving unit 112 receives data from the transmitting wireless station 3000, and performs a CRC check to determine whether data have been correctly received (step S3013).

If data have been received correctly (YES in S3013), the receiving unit 112 supplies the received data to the data extracting unit 1011. The data extracting unit 1011 separates the ID number of the transmitting wireless station from the received data, and stores the extracted ID number in the data storage unit 111, while outputting the other components of the received data externally. Then, the random value selector 2012 reads the ID number of the transmitting wireless station 3000 and the total number (Hc) of transmit timing sequences out of the data storage unit 111 to select a random value (R) using the readout values. The random sequence estimator 2013 estimates a random sequence (Rs) using the selected random value (R). The transmit timing estimator 3014 estimates a transmit timing sequence (Hs) using the estimated random sequence (Rs), and stores the transmit timing sequence in the data storage unit 111 (step S3014).

After the estimation of transmit timing sequence (Hs) in step S3014 or after the negative determination as to correct receiving of data (NO in S3013), the burst/continuous receive control unit 3011 determines whether the continuous receive time (Ctime) is finished (step S3015).

If the continuous receive time (Ctime) is finished (YES in S3015), or if it is determined that continuous receive is unnecessary in step S3011, the clock generating unit 3013 starts counting clocks, and stores the count value as the receive clock information (clock_r) in the data storage unit 111 (step S3016).

Then, the burst/continuous receive control unit 3011 determines whether it is at data transmit timing for any known transmitting wireless station 3000, based on the transmit timing sequences (Hs) of all the known transmitting wireless stations 3000 and the receive clock information (clock_r) stored in the data storage unit 111 (step S3017). If any known transmitting wireless station 3000 is at data transmit timing (YES in S3017), the receiving unit 112 receives data from the corresponding transmitting wireless station 3000 via the antenna 116 and performs a CRC check. When the data have been received correctly, the receiving unit 112 supplies the received data to the data extracting unit 1011. The data extracting unit 1011 separates the transmitting wireless station ID from the received data, and stores the transmitting wireless station ID, while outputting the other components of the received data externally (step S3018).

After the data separation (S3018) or after the negative determination as to the transmit timing of any known transmitting wireless station 3000 (NO in S3017), the power on/off unit 115 determines whether a power-off instruction has been received externally (step S3019). If no power-off instruction has been received (NO in S3019), the steps from S3011 to S3018 are repeated. Upon receiving the power-off instruction (YES in S3019), the power on/off unit 115 turns off the internal circuits of the receiving wireless station 3010, and the process terminates.

Fifth Embodiment

Figure 23:
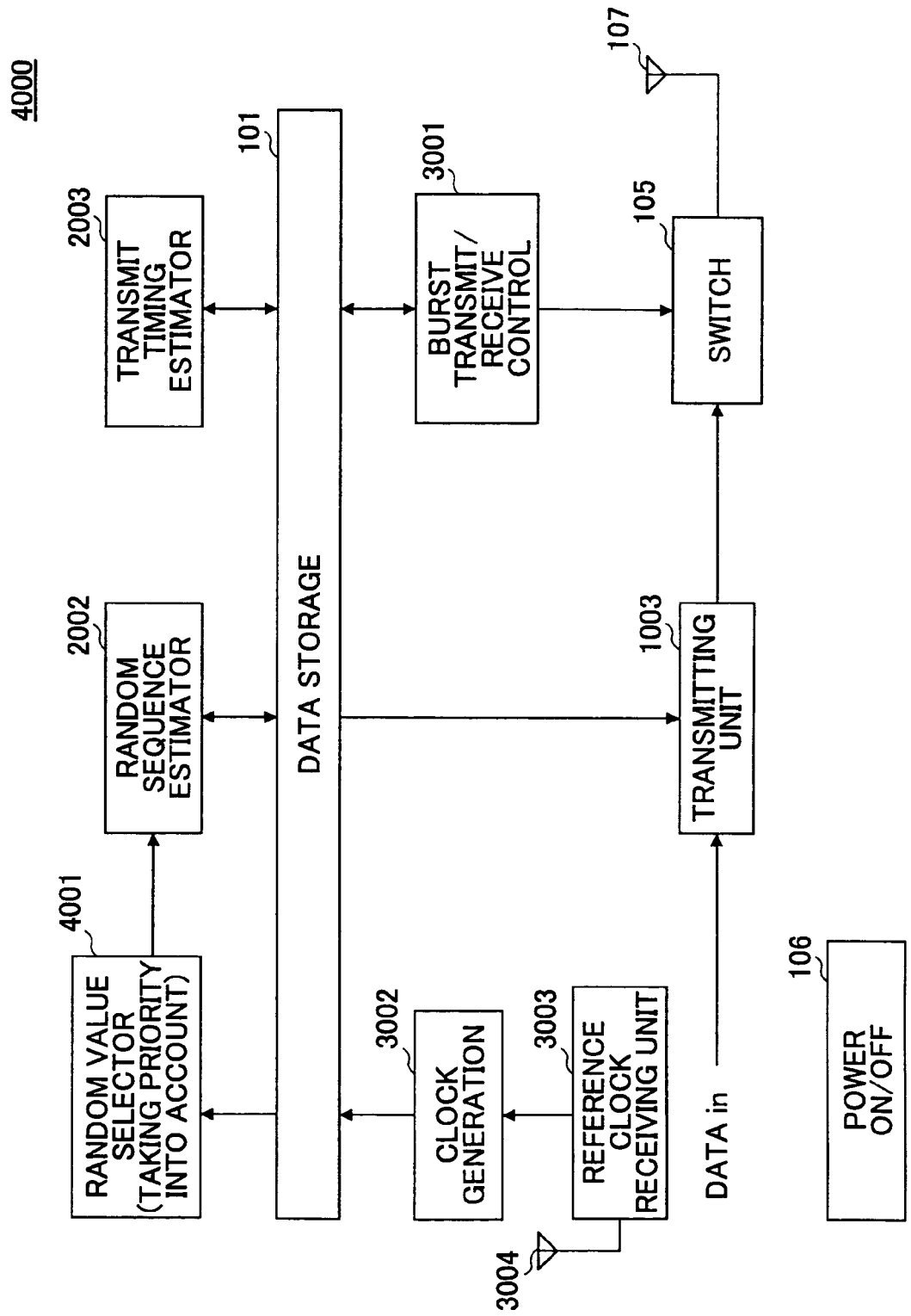
FIG. 23 is a schematic block diagram of the transmitting wireless station according to the fifth embodiment of the invention.

FIG. 23 is a schematic block diagram of the transmitting wireless station 4000 according to the fifth embodiment of the invention. The transmitting wireless station 4000 includes a data storage unit 101, a switch 105, a power on/off unit 106, an antenna 107, a transmitting unit 1003, a random sequence estimator 2002, and a transmit timing estimator 2003. The transmitting wireless station 4000 also includes a burst transmit/receive control unit 3001, a clock generating unit 3002, a reference clock receiving unit 3003, another antenna 3004, and a random value selector 4001 functioning as transmit timing sequence acquiring means. The same elements as those shown in FIG. 19 are denoted by the same numerical references, and explanation for them is omitted.

The data storage unit 101 stores the identification number (ID) of the transmitting wireless station 4000, a transmit timing sequence (Hs), a transmit timing sequence period (Ht), the focused code number (Hn_t) of the transmit timing sequence, the number of slots (Fslot) in a time frame, a time frame (Ftime), transmit clock information (clock_t), and the transmit timing sequence readout count (Hs_num_t). The data storage unit 101 also stores the total number (Hc) of transmit timing sequences, the codes (Code) used to generate a random sequence, a set of generator polynomials (Rmath), random sequences (Rs), a random sequence mapping table (Rtable), external reference clock receiving interval (Sinterval), external reference clock continuous receive time (Stime), and priority of the transmitting wireless station 4000 (Tpriority). The priority of the transmitting wireless station 4000 represents the transmission frequency in a single time frame, which is applied to a system designed so as to allow data to be transmitted several times in a time frame. The priority of transmitting wireless station 4000 varies depending on the priority of data to be transmitted. For instance, the priority of the transmitting wireless station 4000 rises when transmitting higher-priority data, while it becomes low when transmitting lower-priority data.

The random value selector 4001 reads the transmitting wireless station ID, the total number (Hc) of transmit timing sequences, and the priority information (Tpriority) of the transmitting wireless station 4000 out of the data storage unit 101, and selects a random value (R) based on the readout values. For instance, the random value selector 4001 adds each integer number residing in the range from 0 to the priority (Tpriority) value of transmitting wireless station 4000 to the higher bits of the ID number of the transmitting wireless station 4000 to obtain as many addition results as the transmission frequency (or the priority). Then, the random value selector 4001 divides each of the addition results by the total number (Hc) of transmit timing sequences and adds "1" to the remainder of each division to select as many random values (R) as the transmission frequency (or the priority of the transmitting wireless station 4000), each random value (R) residing in the range from 1 to Hc. The random value selector 4001 outputs the selected random values (R) to the random sequence estimator 2002.

The transmitting unit 1003 outputs the input data, as well as the ID number and the priority information (Tpriority) of the transmitting wireless station 4000 read out of the data storage unit 101. These data items are transmitted externally via the switch 105 and the antenna 107.

Figure 24:
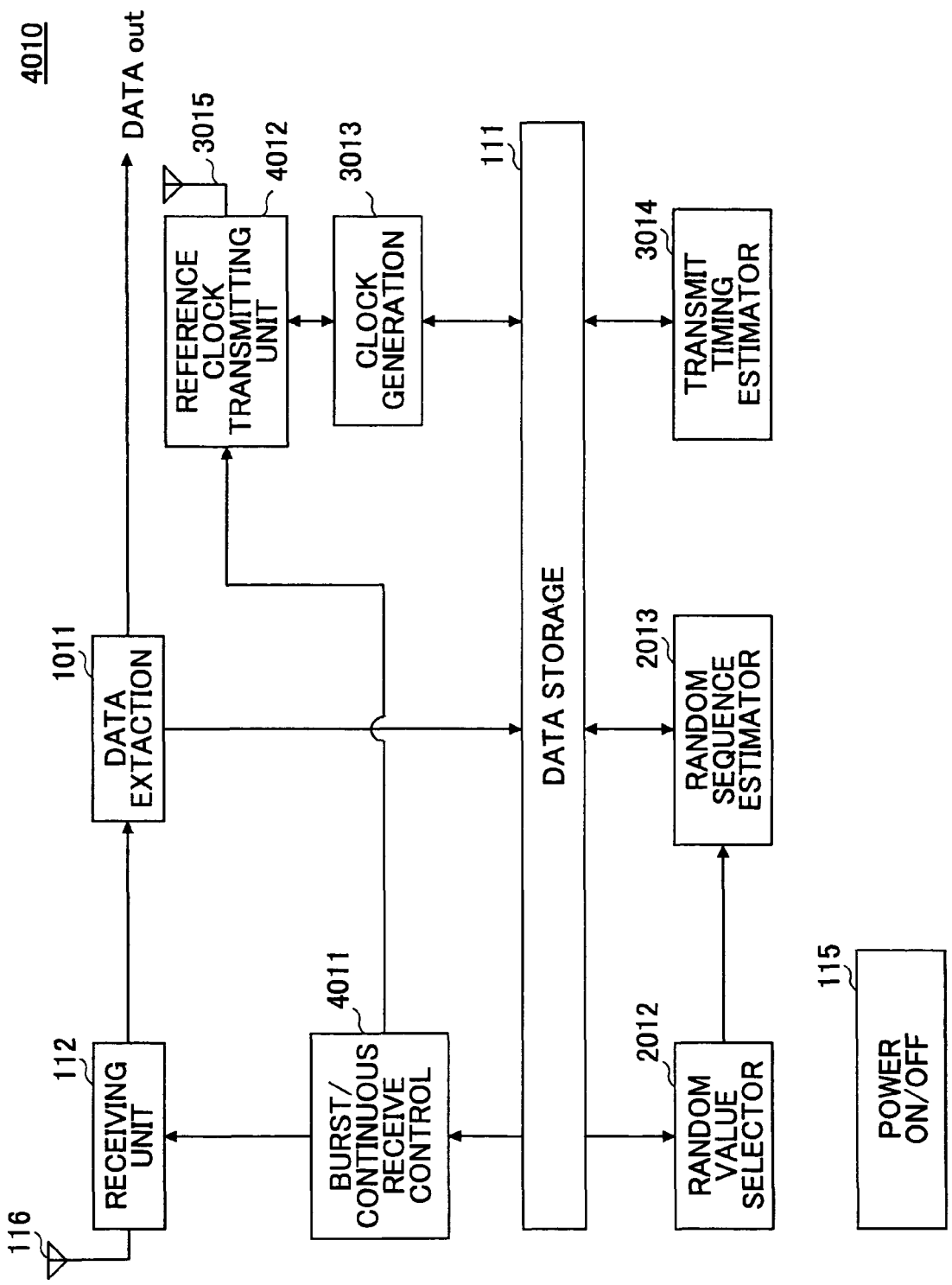
FIG. 24 is a schematic block diagram of the receiving wireless station according to the fifth embodiment of the invention.

FIG. 24 is a schematic block diagram of the receiving wireless station 4010 according to the fifth embodiment of the invention. The receiving wireless station 4010 has a data storage unit 111, a receiving unit 112, a power on/off unit 115, an antenna 116, a data extracting unit 1011, a random value selector 2012, a random sequence estimator 2013, a clock generating unit 3013, a transmit timing estimator 3014, another antenna 3015, a burst/continuous receive control unit 4011 functioning as synchronizing means, and a reference clock transmitting unit 4012 functioning as the reference phase information transmitting means. The same elements as those shown in FIG. 20 are denoted by the same numerical references.

The data storage unit 111 stores the identification number (ID) of each transmitting wireless station 4000, a transmit timing sequence (Hs), a transmit timing sequence period (Ht), the focused code number (Hn_r) of the transmit timing sequence, receive clock information (clock_r), transmit timing sequence readout count (Hs_Num_r), and time frame (Ftime). The data storage unit 111 also stores phase-related receive clock information (clock_r), transmit clock information (clock_t), clock offset (clock_d), the total number (Hc) of transmit timing sequences, codes used to generate a random sequence, a set of generator polynomials (Rmath), random sequences (Rs), a random sequence mapping table (Rtable), continuous receive time (Ctime), continuous receive occurrence interval (Cinterval), priority information (Tpriority) of each transmitting wireless station 4000, a clock transmission interval (Cinterval2), and continuous clock transmission time (Ctime2).

The data extracting unit 1011 separates ID number and the priority information (Tpriority) of the transmitting wireless station 4000 from the input data, and stores the extracted ID number and the priority information (Tpriority) of the transmitting wireless station 4000, while externally outputting the other components of the input data.

The random value selector 2012 reads the transmitting wireless station ID, the total number (Hc) of transmit timing sequences, and the priority information (Tpriority) of the transmitting wireless station 4000 out of the data storage unit 111, and selects a random value (R) based on the readout values. For instance, similar to the random value selector 4001 of the transmitting wireless station 4000, the random value selector 2012 of the receiving wireless station 4010 adds each integer number residing in the range from 0 to the priority (Tpriority) of transmitting wireless station 4000 to the higher bits of the ID number of the transmitting wireless station to obtain as many addition results as the transmission frequency (or the priority) of the transmitting wireless station 4000. Then, the random value selector 2012 divides each of the addition results by the total number (Hc) of transmit timing sequences and adds "1" to the remainder of each division to select as many random values (R) as the transmission frequency (or the priority of the transmitting wireless station 4000), each random value (R) residing in the range from 1 to Hc. The random value selector 2012 outputs the selected random values (R) to the random sequence estimator 2013.

The burst/continuous receive control unit 4011 supplies an instruction for receiving data during the continuous receive time (Ctime) to the receiving unit 112 after every continuous receive occurrence interval (Cinterval) in order to confirm if there is any unknown transmitting wireless station 4000 existing within the communicating range of the receiving wireless station 4010.

Other than the continuous receive time (Ctime), the burst/continuous receive control unit 4011 reads the transmit timing sequence (Hs), the transmit timing sequence period (Ht), the focused code number (Hn_r) of the transmit timing sequence, the time frame (Ftime), the receive clock information (clock_r), and the transmit timing sequence readout count (Hs_num_r) out of the data storage unit 111. The burst/continuous receive control unit 4011 adds the current code value corresponding to the focused code number (Hn_r) of the transmit timing sequence (Hs) to the product (Hs_num_r×Ftime×Ht) obtained from the transmit timing sequence readout count (Hs_num_r), the time frame (Ftime), and the transmit timing sequence period (Ht). The receive/continuous control unit 4011 compares the sum (or the addition result) with the receive clock information (clock_r). If these two are the same, the burst/continuous receive control unit 4011 generates and supplies an await instruction to the receiving unit 112. If the two values are not consistent with each other, the burst/continuous receive control unit 4011 does not generate the await instruction.

If the addition result agrees with the receive clock information (clock_r), the burst/continuous receive control unit 4011 increments or adds "1" to the focused code number (Hn_r) of the transmit timing sequence. If the focused code number (Hn_r) of the transmit timing sequence reaches or exceeds the transmit timing sequence period (Ht) as a result of the increment, then the burst/continuous receive control unit 4011 subtracts the transmit timing sequence period (Ht) from the incremented current code value (Hn_r) of the transmit timing sequence, and uses this subtraction result as the undated focused code number (Hn_r) of the transmit timing sequence for the subsequent process. In addition, the burst/continuous receive control unit 4011 adds "1" to the transmit timing sequence readout count (Hs_num_r), and uses the incremented value as the new transmit timing sequence readout count (Hs_num_r) for the subsequent process.

The burst/continuous receive control unit 4011 reads the clock transmission interval (Cinterval2) and continuous clock transmission time (Ctime2), and determines whether it is time to transmit external reference clocks, based on the readout values. If it is time to transmit external reference clocks, the burst/continuous receive control unit 4011 instructs the reference clock transmitting unit 4012 to transmit external reference clocks.

The clock generating unit 3013 counts clocks, and stores the count value as the receive clock information (clock_r) in the data storage unit 111. At the same time, the clock generating unit 3013 supplies the count value to the reference clock transmitting unit 4012. Upon the instruction for transmitting external reference clocks from the burst/continuous receive control unit 4011, the reference clock transmitting unit 4012 transmits the receive clock information (clock_r) supplied from the clock generating unit 3013, as the external reference clock, via the antenna 3015.

Next, explanation is made of the operations of the transmitting wireless station 4000 and the receiving wireless station 4010 of the fifth embodiment, with reference to the flowcharts.

Figure 25:
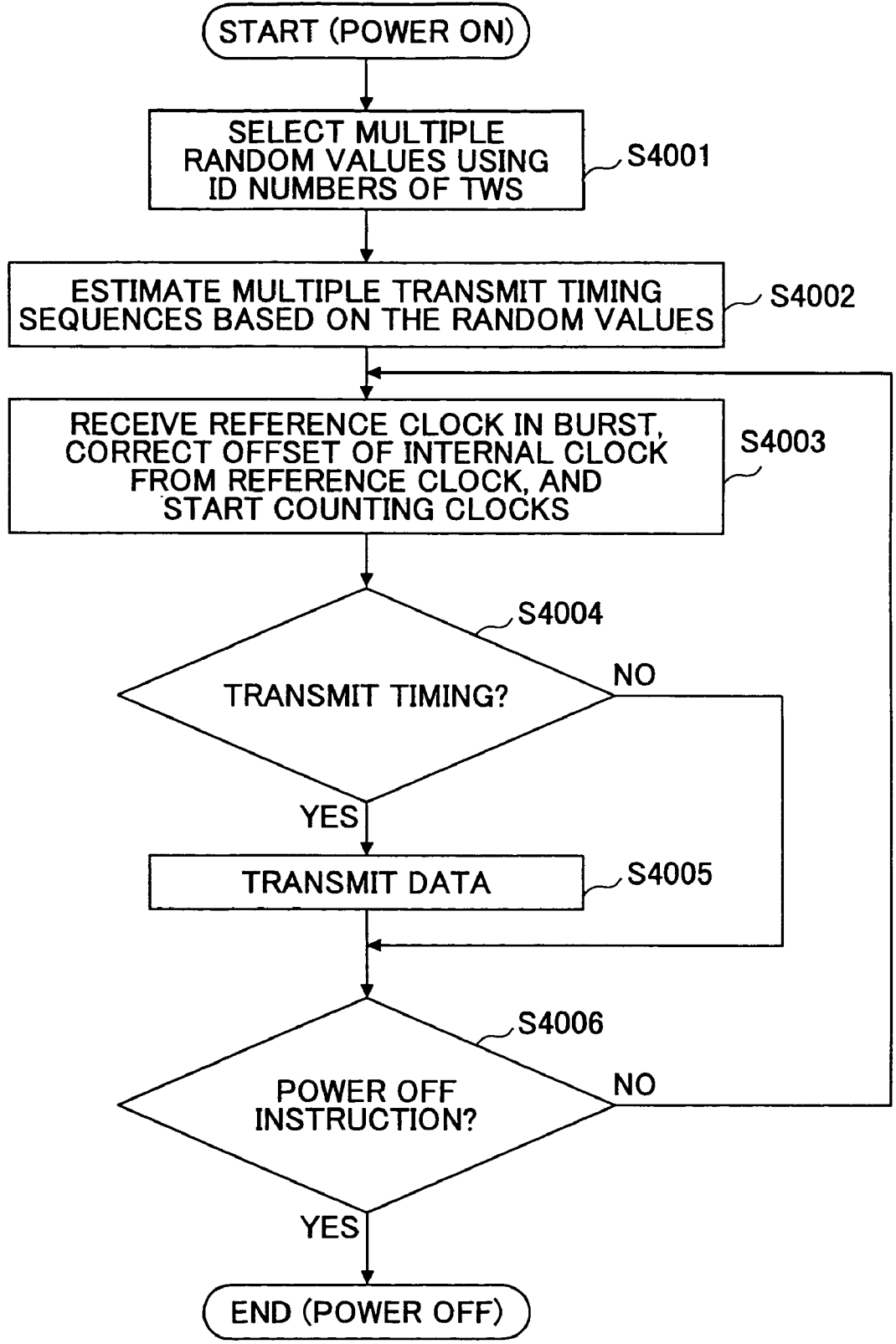
FIG. 25 is a flowchart of the operations carried out by the transmitting wireless station according to the fifth embodiment of the invention.

FIG. 25 is a flowchart showing the operations executed by the transmitting wireless station 4000 according to the fifth embodiment. When the power on/off unit 106 turns on the internal circuits of the transmitting wireless station 4000 in response to an externally supplied instruction, the random value selector 4001 reads the ID number and the priority information (Tpriority) of the transmitting wireless station 4000, together with the total number (Hc) of transmit timing sequences, out of the data storage unit 101, and selects multiple random values (R), that is, as many random values as the priority (Tpriority) of the transmitting wireless station 4000, using the readout values (step S4001).

The random sequence estimator 2002 estimates as many random sequences (Rs) as the priority (Tpriority) of the transmitting wireless station 4000, using the random values (R). The transmit timing estimator 2003 estimates as many transmit timing sequences (Hs) as the priority (Tpriority) of the transmitting wireless station 4000, using the estimated random sequences (Rs) (step S4002).

Then, the clock generating unit 3002 starts counting clocks, and stores the count value as the transmit clock information (clock_t) in the data storage unit 101 (step S4003).

The burst transmit/receive control unit 3001 instructs the reference clock receiving unit 3003 to receive external reference clocks when it becomes time to receive the external reference clocks. In response to the instruction, the reference clock receiving unit 3003 receives external reference clocks (or the reference clock information (Clock_s)) via the antenna 3004. The clock generating unit 3002 corrects transmit clock information (clock_t) being generated, based on the reference clock information (Clock_s), and starts counting clocks (step S4003).

The burst transmit/receive control unit 3001 determines whether it is at transmit timing (step S4004). To be more precise, the burst transmit/receive control unit 3001 reads the transmit timing sequences (Hs), the transmit timing sequence period (Ht), the current number (Hn_t) of the transmit timing sequence, the time frame (Ftime), the transmit clock information (clock_t), and the transmit timing sequence readout count (Hs_num_t). The burst transmit/receive control unit 3001 adds the current code value corresponding to the focused code number (Hn_t) of the transmit timing sequence (Hs) to the product (Hs_num_t×Ftime×Ht) of the transmit timing sequence readout count (Hs_num_t), the time frame (Ftime), and the transmit timing sequence period (Ht). The burst transmit/receive control unit 3001 compares the sum (or the addition result) with the transmit clock information (clock_t). If these two are the same, the burst transmit/receive control unit 3001 determines that it is at transmit timing and supplies a switch-on instruction to the switch 105 (YES in S4004). If the two values are not consistent with each other, the burst transmit/receive control unit 3001 determines that it is not transmit timing and does not generate the switch-on instruction (NO in S4004).

The transmitting unit 1003 outputs the input data, as well as the ID number and the priority information (Tpriority) of the transmitting wireless station 4000 read out from the data storage unit 101. Since at transmit timing the switch 105 is closed in response to the switch-on instruction, the data output from the transmitting unit 1003 are transmitted from the antenna 107 (step S4005).

After the data transmission (S4005), or after the negative determination as to the transmit timing (NO in S4004), the power on/off unit 106 determines whether a power-off instruction has been received externally (step S4006). If no power-off instruction has been received (NO in S4006), the steps from S4003 to S4005 are repeated. Upon the power-off instruction (YES in S4006), the power on/off unit 106 turns off the internal circuits of the transmission wireless station 4000, and the process terminates.

Figure 26:
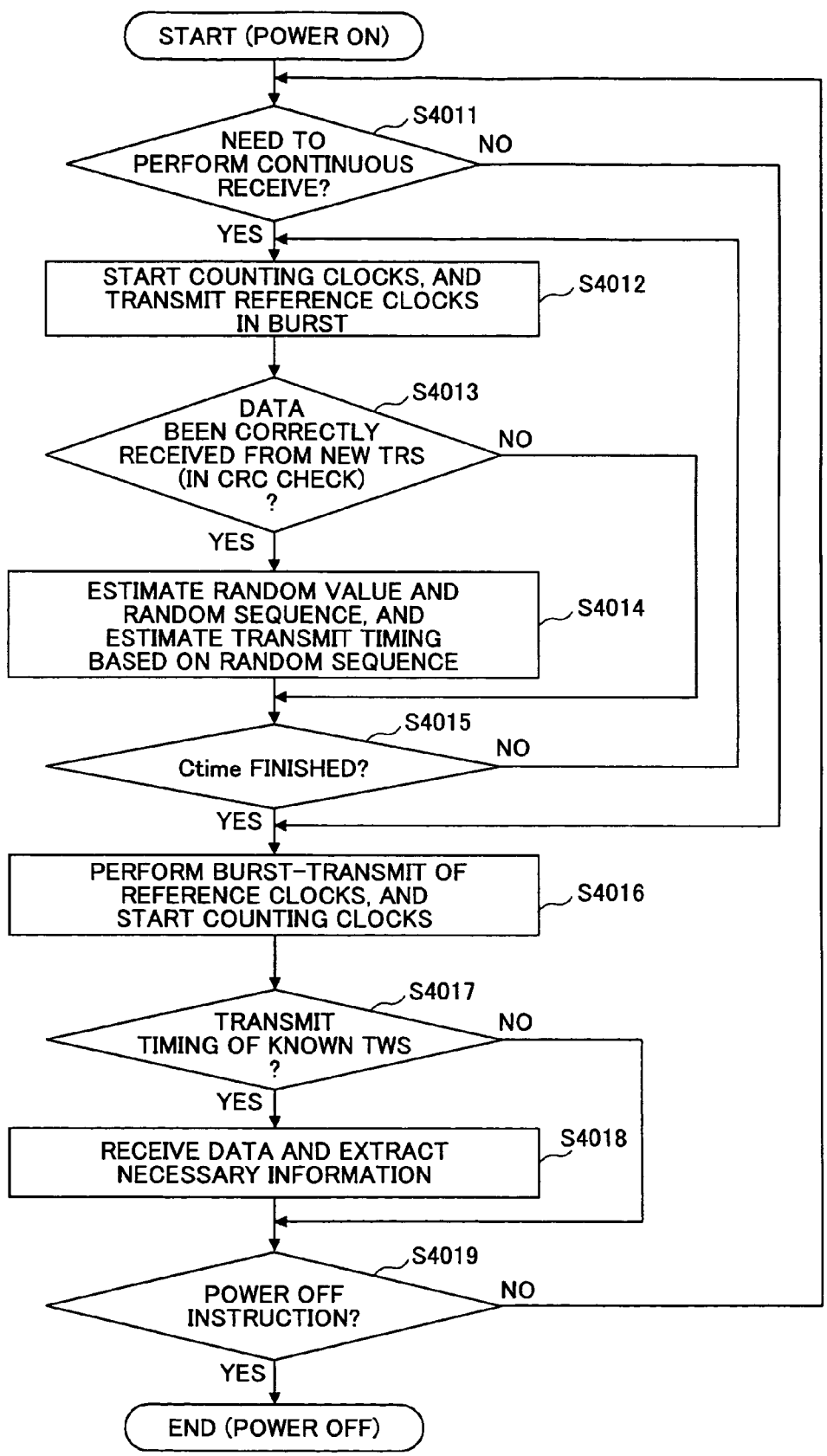
FIG. 26 is a flowchart of the operations carried out by the receiving wireless station according to the fifth embodiment of the invention.

FIG. 26 is a flowchart showing the operations executed by the receiving wireless station 4010 according to the fifth embodiment. When the power on/off unit 115 turns on the internal circuits of the receiving wireless station 4010 in response to an externally supplied instruction, the burst/continuous receive control unit 4011 determines whether it is necessary to perform continuous receive in order to confirm if there is any unknown transmitting wireless station 4000 existing within the communicating range of the receiving wireless station 4010 (step S4011).

If it is necessary to perform continuous receive (YES in S4011), and if it is time to transmit external reference clocks, then the burst/continuous receive control unit 4011 instructs the reference clock transmitting unit 4012 to transmit external reference clocks. In response to the instruction, the reference clock transmitting unit 4012 transmits receive clock information (clock_r) as the external reference clock, via the antenna 3015 (step S4012).

The receiving unit 112 receives data from the transmitting wireless station 4000, and performs a CRC check to determine whether data have been correctly received (step S4013).

If data have been received correctly (YES in S4013), the receiving unit 112 supplies the received data to the data extracting unit 1011. The data extracting unit 1011 separates the ID number and the priority information (Tpriority) of the transmitting wireless station 4000 from the received data, and stores the extracted ID number and the priority information (Tpriority) in the data storage unit 111, while outputting the other components of the received data externally. Then, the random value selector 2012 reads the ID number and the priority information (Tpriority) of the transmitting wireless station 4000 and the total number (Hc) of transmit timing sequences out of the data storage unit 111 to selects as many random values (R) as the number indicated by the priority information (Tpriority), using the readout values. The random sequence estimator 2013 estimates as many random sequences (Rs) as the number indicated by the priority information (Tpriority), using the selected random values (R). The transmit timing estimator 3014 estimates as many transmit timing sequences (Hs) as the number indicated by the priority information (Tpriority), using the estimated random sequences (Rs) (step S4014).

After the estimation of transmit timing sequences (Hs) in step S4014 or after the negative determination as to correct receiving of data (NO in S4013), the burst/continuous receive control unit 4011 determines whether the continuous receive time (Ctime) is finished (step S4015).

If the continuous receive time (Ctime) is finished (YES in S4015), or if it is determined that continuous receive is unnecessary in step S4011, the clock generating unit 3013 starts counting clocks, and stores the count value as the receive clock information (clock_r) in the data storage unit 111 (step S4016).

Then, the burst/continuous receive control unit 4011 determines whether it is at data transmit timing for any known transmitting wireless station 4000, based on the transmit timing sequence sets (Hs) of all the known transmitting wireless stations 4000 and the receive clock information (clock_r) stored in the data storage unit 111 (step S4017). If any known transmitting wireless station 4000 is at data transmit timing (YES in S4017), the receiving unit 112 receives data from the corresponding transmitting wireless station 4000 via the antenna 116 and performs CRC check. When the data have been received correctly, the receiving unit 112 supplies the received data to the data extracting unit 1011. The data extracting unit 1011 separates the ID number and the priority information (Tpriority) of the transmitting wireless station 4000 from the received data, and stores the ID number and the priority information in the data storage unit 111, while outputting the other components of the received data externally (step S4018).

After the data separation (S4018) or after the negative determination as to the transmit timing of any known transmitting wireless station 4000 (NO in S4017), the power on/off unit 115 determines whether a power-off instruction has been received externally (step S4019). If no power-off instruction has been received (NO in S4019), the steps from S4011 to S4018 are repeated. Upon the power-off instruction (YES in S4019), the power on/off unit 115 turns off the internal circuits of the receiving wireless station 4010, and the process terminates.

Sixth Embodiment

Figure 27A:
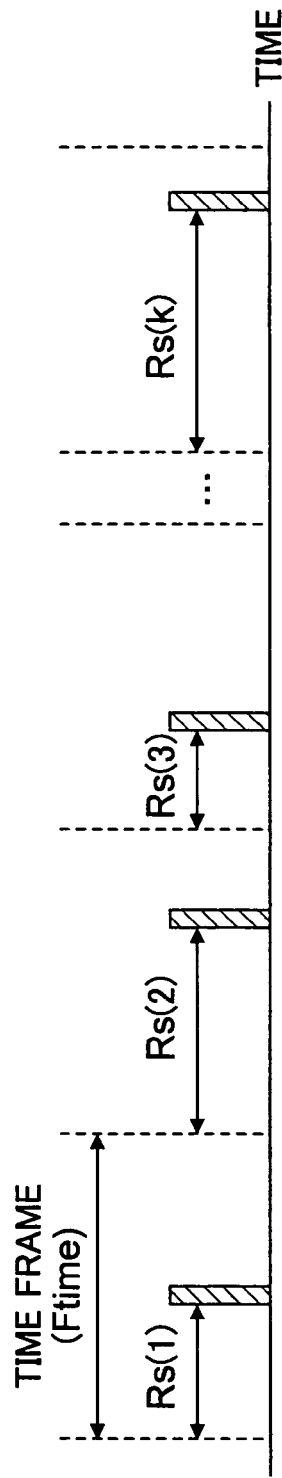
FIG. 27A schematically illustrates the correspondence between each symbol of a random sequence and a time slot in the associated frame (transmit timing), and FIG. 27B schematically illustrates the correspondence between each symbol of a random sequence and the associated time interval of transmit timing, according to the sixth embodiment of the invention.

The sixth embodiment is described with reference to FIG. 27A and FIG. 27B. In the sixth embodiment, the relation between a random sequence and a transmit timing sequence as described in the first through fifth embodiments is explained. In FIG. 27A, a random sequence (Rs) consists of numbers, each number corresponding to a certain slot number in one of time frames involved in a transmit timing sequence. For example, the random sequence (Rs) is "5702725", which is associated with the transmit timing sequence corresponding to seven time frames. The first digit "5" of the random sequence (Rs) corresponds to the transmit timing of the sixth slot in the first frame. The second digit "7" corresponds to the transmit timing of the 8th slot of the second time frame. The third digit "0" of the random sequence (Rs) corresponds to the transmit timing of the first slot of the third time frame. Similarly, the subsequent digits "2", "7,", "2", and "5" correspond to the third slot in the $4^{th}$ time frame, the $8^{th}$ slot in the $5^{th}$ time frame, the third slot in the $6^{th}$ time frame, and the $6^{th}$ slot in the $7^{th}$ time frame, respectively.

Figure 27B:
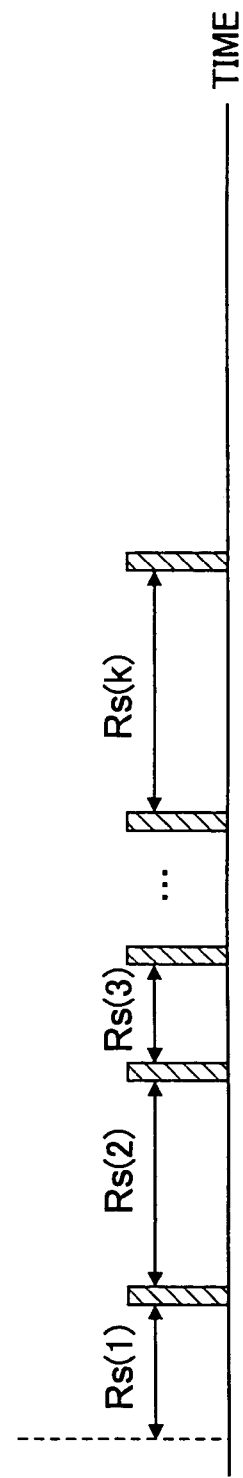

In FIG. 27B, a random sequence (Rs) consists of numbers, each number representing the time interval between adjacent transmit timings. For example, if the random sequence (Rs) is "4512327", the $5^{th}$, the $11^{th}$, the $13^{th}$, the $16^{th}$, the $20^{th}$, the $23^{rd}$, and the $31^{st}$ slots beginning from the leading slot correspond to the respective transmit timings.

Seventh Embodiment

In the seventh embodiment, how the continuous receive time (Ctime) and the continuous receive occurrence interval (Cinterval) described in the second through fifth embodiments are set is explained, with reference to FIG. 28A through FIG. 28D. The continuous receive time (Ctime) and the continuous receive occurrence interval (Cinterval) stored in, for example, the receiving wireless station 2010 are parameters defining continuous receive, during which the receiving wireless station 2010 searches for unknown transmitting wireless stations 2000 existing around the receiving wireless station, and intermittent receive for reducing power consumption. The continuous receive time (Ctime) represents time duration of the continuous receive mode, and the continuous receive occurrence interval (Cinterval) represents time duration of the intermittent receive mode.

Figure 28A:
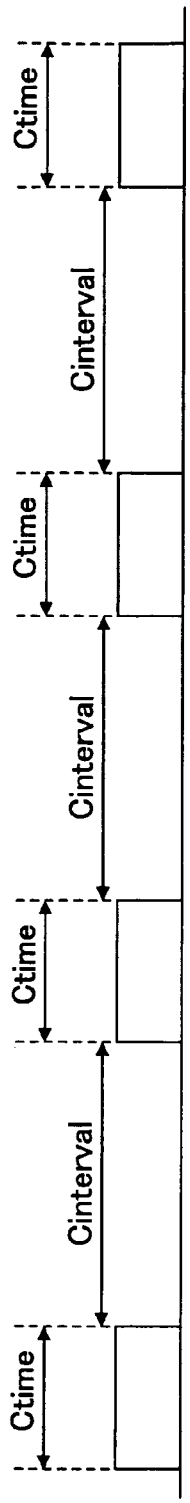
FIG. 28A through FIG. 28D illustrate examples of continuous receiving time frames and intervals between the continuous receiving time frames according to the seventh embodiment of the invention.
Figure 28B:
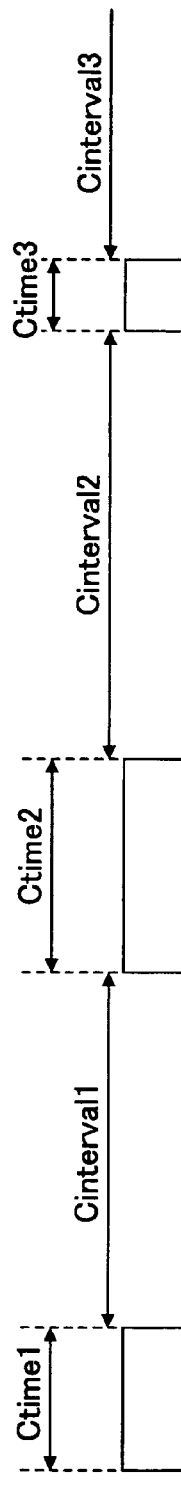
Figure 28C:
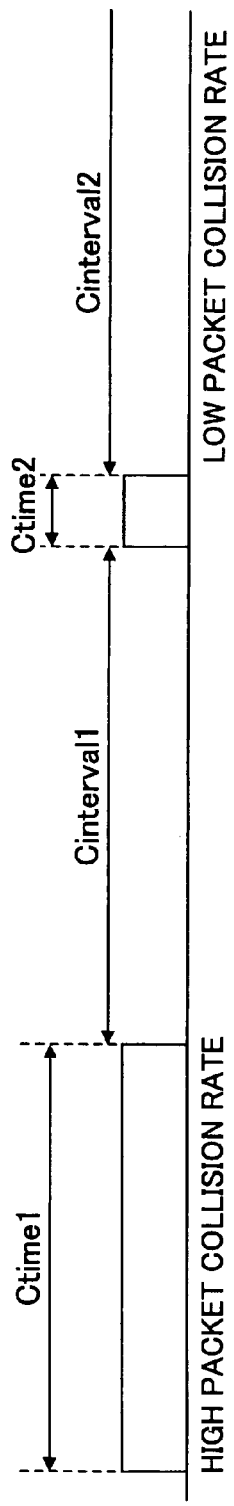
Figure 28D:
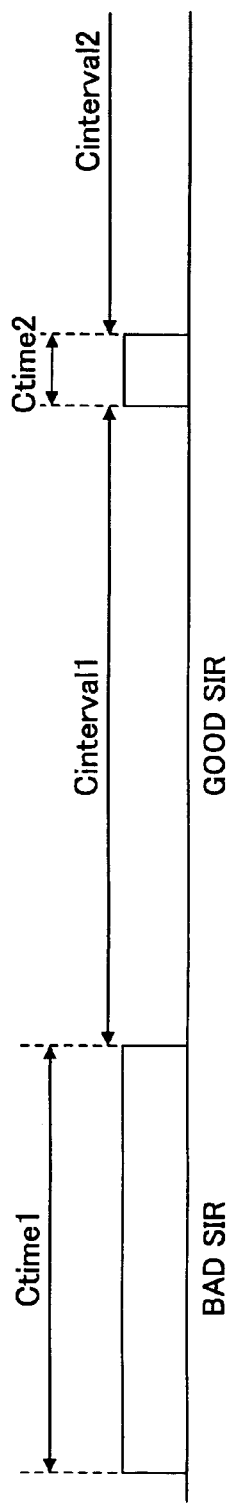

In the example shown in FIG. 28A, the receiving unit 112 performs continuous receive in the initially set continuous receive time (Ctime) and performs intermittent receive at the initially set continuous receive occurrence interval (Cinterval). In the example shown in FIG. 28B, continuous receive and intermittent receive are performed so as to correspond to the exponential distributions of the average of the continuous receive times (Ctime) and the average of the continuous receive occurrence intervals (Cinterval), respectively. In the example shown in FIG. 28C, continuous receive and intermittent receive are switched at the receiving unit 112, based on the frequency of packet collision caused by simultaneous transmission of multiple transmitting wireless stations 2000. If the packet collision rate (or the packet collision frequency)

is high, continuous receive is performed. If the packet collision rate is low, intermittent receive is performed. In the example shown in FIG. 28D, the receiving unit 112 performs continuous receive when the signal-to-interference ratio (SIR) characteristic or the carrier-to-interference ratio (CIR) characteristic is unsatisfactory. On the other hands, intermittent receive is performed when the SIR or the CIR is good.

Figure 29A:
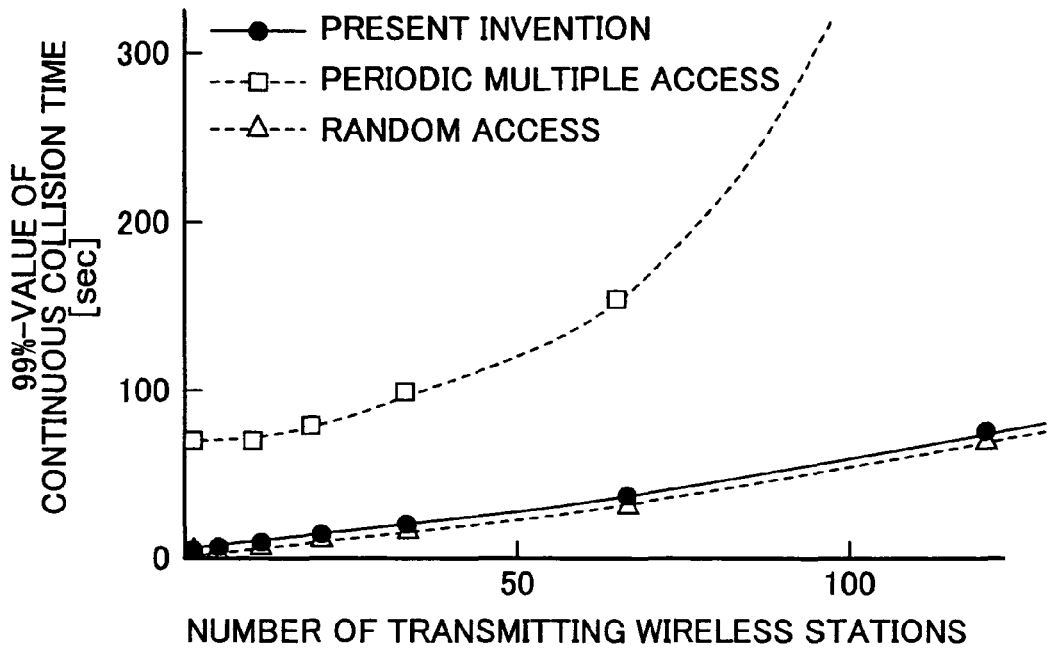
FIG. 29A and FIG. 29B illustrate simulation results of the present invention.
Figure 29B:
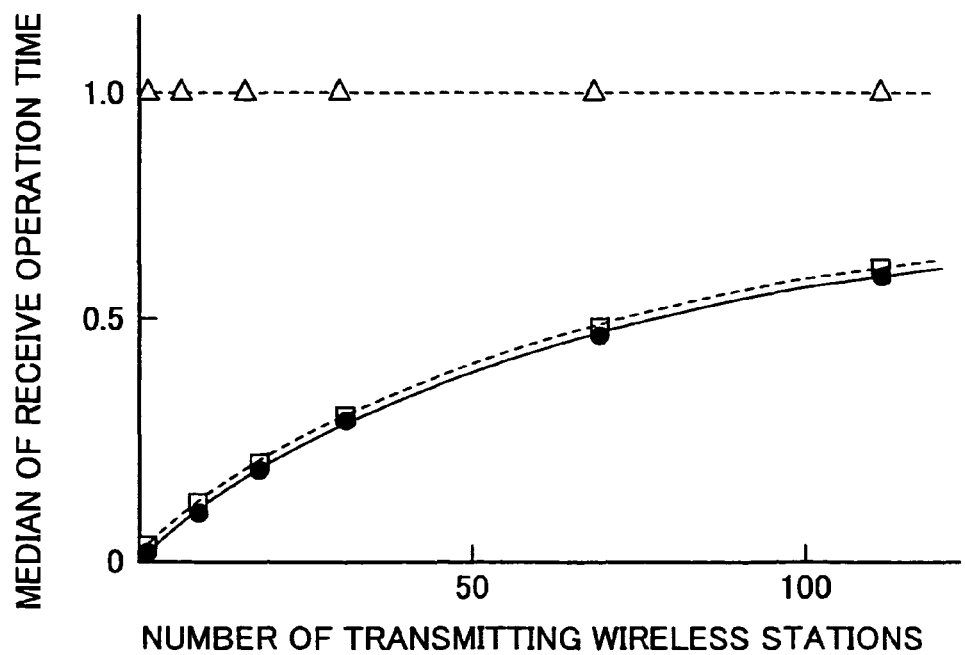

FIG. 29A and FIG. 29B illustrate simulation results performed by the inventors under the condition of 9600-bps transmission rate, 135-bit slot length (which is the sum of the 128-bit data and 7-bit phase information), 127 transmit timing sequence period (Ht), and 1.8-second time frame. The code used in the simulation is RS code, and no FEC or ARQ is applied. FIG. 29A is a graph of the 99%-value of continuous collision time (which is the 99% value of the maximum continuous collision time among several times of simulations), as a function of the number of transmitting wireless stations. The multiple access method of the present invention exhibits as good characteristic as that of the conventional random access scheme. FIG. 29B is a graph of the median of receive operation time as a function of the number of transmitting wireless stations. The multiple access method of the present invention exhibits as good characteristic as that of the conventional periodical multiple access scheme.

As has been described above, the transmitting wireless station according to the preferred embodiments derives a transmit timing sequence (Hs) based on the unique ID number of the transmitting wireless station itself. Accordingly, undesirable overlap of transmit timing among multiple transmitting wireless stations is avoided, and data collision can be prevented. Each of the transmitting wireless stations may derives an independent transmit timing sequence using a common value. On the other hand, the receiving wireless station according to the preferred embodiments derives the transmit timing of the transmitting wireless stations, and brings the receive timing of the receiving wireless station in synchronization with the transmit timing of the transmitting wireless stations, based on transmit timing information (clock_t) and receive clock information (clock_r). This means that the receiving wireless station can perform the receiving operations only when the transmit timing of a transmitting wireless station is at data transmit timing. Consequently, power consumption of the receiving wireless station can be reduced.

In addition, since the transmitting wireless station can perform data transmission using a transmit timing sequence (Hs) generated by an external apparatus, as described in the first embodiment, the structure of the transmitting wireless station can be simplified. The transmitting wireless station can change the packet structure (or the data transmission unit), as described in the third embodiment of the invention. On the other hand, the receiving wireless station can switch between the continuous receive mode and the intermittent receive mode according to the receiving environment. Accordingly, even when searching for unknown transmitting wireless stations existing in communication range, the receiving wireless station can operate in the appropriate receiving mode, reducing the power consumption in the receiving operation.

The present invention is applicable to various transmission schemes with different data units or different bit structures.

This patent application is based on and claims the benefit of the earlier filing date of Japanese Patent Application No. 2003-317465 filed Sep. 9, 2003, the entire contents of which are hereby incorporated by reference.

What is claimed is:

1. A receiving station for receiving information from one or more transmitting stations, comprising:
   a receiving unit configured to receive information containing a unique value of the transmitting station;
   an extracting unit configured to extract the unique value from the received information;
   a clock generation unit configured to generate clock information;
   a memory configured to store a transmit timing sequence in association with each of the one or more transmitting stations, the transmit timing sequences consisting of a plurality of codes to identify plural different time slots for transmission;
   a transmit timing sequence acquiring unit configured to acquire the transmit timing sequence of the transmitting station from the memory based on the extracted unique value;
   a control unit configured to determine whether a code value corresponding to a currently focused code number of the transmit timing sequence corresponds to the clock information; and
   a synchronizing unit configured to bring receive timing of the receiving station in synchronization with transmit timing of the transmitting station if the code value corresponds to the clock information.

2. The receiving station of claim 1, wherein,
   the transmit timing sequence acquiring unit estimates a phase of the transmitting station, and
   the synchronizing unit brings the receive timing of the receiving station in synchronization with the transmit timing of the transmitting station based on the estimated phase.

3. The receiving station of claim 1, wherein,
   the receiving unit receives information containing phase information of the transmitting station,
   the extracting unit extracts the phase information from the received information, and
   the synchronizing unit brings the receive timing of the receiving station in synchronization with the transmit timing of the transmitting station based on the extracted phase information.

4. The receiving station of claim 1, wherein the receiving unit performs intermittent receive for receiving information at receive timing corresponding to the transmit timing sequence.

5. The receiving station of claim 1, wherein the receiving unit performs intermittent receive for receiving information at receive timing corresponding to the transmit timing sequence, and performs continuous receive for searching for an unknown transmitting station during a period when the intermittent receive is not performed.

6. The receiving station of claim 5, wherein the receiving unit changes the ratio of the intermittent receive to the continuous receive.

7. The receiving station of claim 1, further comprising:
   a correcting unit configured to correct phase information of the receiving station based on reference phase information, wherein
   the synchronizing unit brings the receive timing of the receiving station in synchronization with the transmit timing of the transmitting station based on the corrected phase information.

8. The receiving station of claim 1, further comprising:
   a reference phase information transmitting unit configured to transmit phase information of the receiving station as reference phase information, wherein
   the synchronizing unit brings the receive timing in synchronization with the transmit timing of the transmitting station based on the reference phase information.

9. The receiving station of claim 1, wherein the transmit timing sequence acquiring unit acquires a plurality of transmit timing sequences for the transmitting station.

10. The receiving station of claim 1, wherein,
the control unit determines whether a sum of the code value corresponding to the currently focused code number in the transmit timing sequence and a product (Hs_num_r*Ftime*Ht) is the same as the clock information, where Hs_num_r denotes a transmit timing sequence readout count, Ftime denotes a time length of a frame, and Ht denoting a transmit timing sequence period, and
the synchronizing unit is configured to bring receive timing of the receiving station in synchronization with transmit timing of the transmitting station if the sum is the same as the clock information.

11. A receiving station used in a wireless communications system, comprising:
a receiving unit configured to receive information from transmitting station included in the wireless communications system;
a data extracting unit configured to extract ID information of the transmitting station from the received information;
a clock generation unit configured to generate clock information;
a memory configured to store a transmit timing sequence in association with the transmitting station in the wireless communication system, the transmit timing sequence consisting of a plurality of codes to identify plural different time slots for transmission;
a transmit timing sequence acquiring unit configured to acquire a transmit timing sequence of said transmitting station from the memory based on the ID information; and
a controller configured to determine whether the transmitting station is at transmit timing based on whether a code value corresponding to a currently focused code number of the acquired transmit timing sequence corresponds to the generated clock information and to cause the receiving unit to receive data from the transmitting station if it is at the transmit timing of the transmitting station.

12. The receiving station of claim 11, wherein the transmit timing sequence acquiring unit comprises:
a random value selector configured to select a random value based on the ID information;
a random sequence estimator configured to estimate a random sequence based on the random value; and
a transmit timing estimator configured to estimate the transmit timing sequence based on the random sequence.

* * * * *